(12) United States Patent
Kawamoto

(10) Patent No.: US 11,654,359 B2
(45) Date of Patent: May 23, 2023

(54) INFORMATION PROCESSING DEVICE, EXTRACTION DEVICE, INFORMATION PROCESSING METHOD, AND EXTRACTION METHOD

(71) Applicant: SONY CORPORATION, Tokyo (JP)

(72) Inventor: Kenta Kawamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 76 days.

(21) Appl. No.: 17/250,252

(22) PCT Filed: Mar. 28, 2019

(86) PCT No.: PCT/JP2019/013847
§ 371 (c)(1),
(2) Date: Dec. 21, 2020

(87) PCT Pub. No.: WO2020/003671
PCT Pub. Date: Jan. 2, 2020

(65) Prior Publication Data
US 2021/0260481 A1 Aug. 26, 2021

(30) Foreign Application Priority Data
Jun. 29, 2018 (JP) .............................. JP2018-125071

(51) Int. Cl.
*A63F 13/5375* (2014.01)
*A63F 13/67* (2014.01)

(52) U.S. Cl.
CPC .......... *A63F 13/5375* (2014.09); *A63F 13/67* (2014.09)

(58) Field of Classification Search
CPC ...... A63F 13/5375; A63F 13/67; A63F 13/30; A63F 13/422; A63F 13/79
See application file for complete search history.

(56) References Cited

U.S. PATENT DOCUMENTS 9,802,125 B1 * 10/2017 Suskind ................ A63F 13/847
10,279,264 B1 * 5/2019 Aghdaie ................ A63F 13/67
(Continued)

FOREIGN PATENT DOCUMENTS

CN 104182607 A 12/2014
CN 105531003 A 4/2016
(Continued)

OTHER PUBLICATIONS

Silver, et al., "Mastering the game of Go with deep neural networks and tree search", Nature, vol. 529, No. 7587, Article, doi:10.1038/nature16961, Jan. 2016, 38 pages.

(Continued)

*Primary Examiner* — James S. McClellan
(74) *Attorney, Agent, or Firm* — Chip Law Group

(57) ABSTRACT

An information processing device includes an output control unit. When a game status approaches a specific phase, the output control unit outputs, to a game device, guiding command information to change a command signal received from a first player in response to the game status approaches the specific phase, wherein the guiding command information is guiding a current game status of the first player to a reproduction game status. In the reproduced game status a specific phase is reproduced in a game status of a second player having higher learning level than the first player.

13 Claims, 16 Drawing Sheets

(56) References Cited

U.S. PATENT DOCUMENTS

| | | |
|---|---|---|
| 2014/0351191 A1 | 11/2014 | Kon et al. |
| 2016/0220906 A1 | 8/2016 | Umarov et al. |
| 2017/0259177 A1* | 9/2017 | Aghdaie ................ G06Q 30/02 |
| 2017/0282063 A1* | 10/2017 | Krishnamurthy ....... A63F 13/69 |

FOREIGN PATENT DOCUMENTS

| | | | |
|---|---|---|---|
| JP | 2012-205749 A | 10/2012 | |
| JP | 2014-228725 A | 12/2014 | |
| JP | 2015-054125 A | 3/2015 | |
| KR | 10-2016-0042094 A | 4/2016 | |
| WO | 2015/037303 A1 | 3/2015 | |
| WO | WO-2016205182 A1 * | 12/2016 | ............ A63F 13/211 |

OTHER PUBLICATIONS

International Search Report and Written Opinion of PCT Application No. PCT/JP2019/013847, dated Jun. 25, 2019, 08 pages of ISRWO.

\* cited by examiner

INFORMATION PROCESSING DEVICE, EXTRACTION DEVICE, INFORMATION PROCESSING METHOD, AND EXTRACTION METHOD

CROSS REFERENCE TO RELATED APPLICATIONS

This application is a U.S. National Phase of International Patent Application No. PCT/JP2019/013847 filed on Mar. 28, 2019, which claims priority benefit of Japanese Patent Application No. JP 2018-125071 filed in the Japan Patent Office on Jun. 29, 2018. Each of the above-referenced applications is hereby incorporated herein by reference in its entirety.

FIELD

The present disclosure relates to an information processing device, an extraction device, an information processing method, and an extraction method.

BACKGROUND

One of the interesting thins of content such as a computer game is that a player can feel successful or accomplished when he/she succeeds in a highly difficult task by finely operating a controller or finely giving an action instruction or when he/she acquires a skill difficult to learn. For this reason, there is known a system that causes a computer to simply learn a game (e.g., Non Patent Literature 1). However, it may take a long time for training to acquire a highly difficult skill. Therefore, training content is known with which a technique can be acquired step by step.

CITATION LIST

Non Patent Literature

Non Patent Literature 1: David Silverl and others, "Mastering the game of Go with deep neural networks and tree search", ARTICLE, doi:10.1038/nature16961

SUMMARY

Technical Problem

However, the training content is uniform, and it has been difficult to effectively support improvement in game learning level according to experience or skill of each individual.

Therefore, the present disclosure proposes an information processing device, an extraction device, an information processing method, and an extraction method that are configured to effectively support improvement in game learning level.

Solution to Problem

To solve the problem described above, an information processing device includes: an output control unit that, when a game status approaches a specific phase, outputs guiding command information guiding to a reproduced game status where the specific phase is reproduced, to a game device.

Advantageous Effects of Invention

According to the present disclosure, improvement in learning level can be effectively supported. It should be noted that the effect is not necessarily limited to this description and may have any effect described in the present disclosure.

DESCRIPTION OF EMBODIMENTS

Embodiments of the present disclosure will be described below in detail with reference to the drawings. In each of the following embodiments, the same portions are denoted by the same reference symbols, and a repetitive description thereof will be omitted.

First Embodiment

[Configuration of Information Processing System 1 According to First Embodiment]

Figure 1:
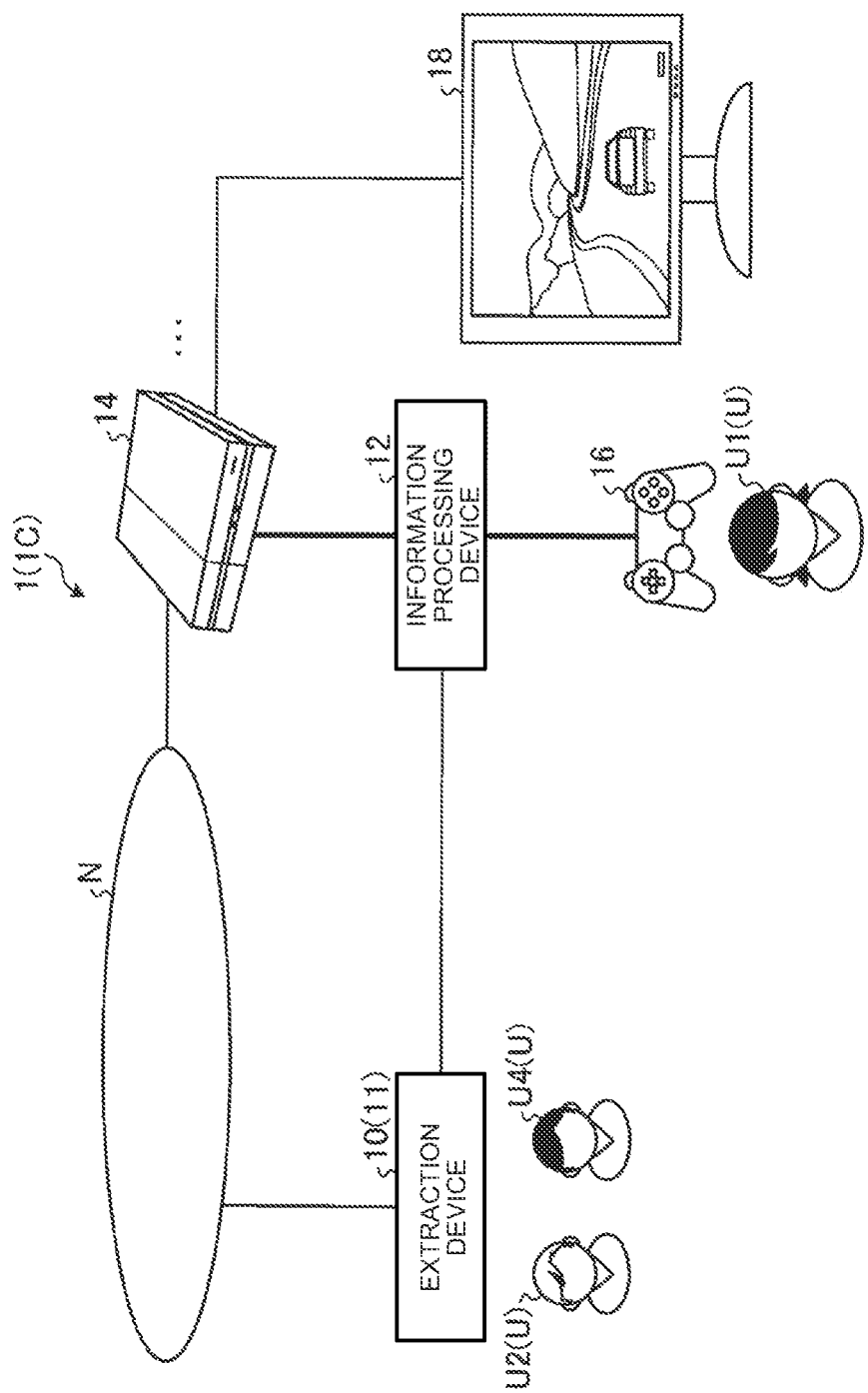
FIG. 1 is a schematic diagram illustrating an example of an information processing system according to a first embodiment of the present disclosure.

FIG. 1 is a schematic diagram illustrating an example of an information processing system 1 of the present embodiment.

The information processing system 1 includes an extraction device 10, an information processing device 12, and a game device 14. The extraction device 10 and the game device 14 are communicably connected via a network N. Note that the extraction device 10 and the game device 14 may be directly connected via a connection cable so as to be communicated with each other. The extraction device 10 and the information processing device 12 are directly connected via a connection cable so as to be communicated with each other. The extraction device 10 and the information processing device 12 may be wirelessly connected. Furthermore, the extraction device 10 and the information processing device 12 may be communicably connected via the network N. Still furthermore, the extraction device 10 and the information processing device 12 may include software modules that operate (in parallel with a game body) on the game device 14.

The game device 14 is a device that executes a game. The game represents content executed on a computer. Specifically, the game represents a simulation game to virtually advance an actual event or experience, or a computer game. In the game, a game status changes depending on a command signal input in response to an operation command or the like given by a player. The player is an agent that transmits the command signal to the game. Specifically, the player is a person (user) or a computer that automatically learns operations of the game. In the present embodiment, a description is made of an example where the player is a person.

The game device 14 includes, for example, a read only memory (ROM) drive, executes a game program in response to insertion of a game ROM into the ROM drive, and operates as the game device 14. Note that the game device 14 is also configured to operate as an emulation device that executes an image file of the game program by activating an emulator program. Note that the emulator program may be acquired via the network N or may be pre-installed before shipment.

An input unit 16 and an output unit 18 are connected to the game device 14 in a wired or wireless manner. The input unit 16 is an input interface device for a player U to input an operation to the game device 14. The input unit 16 outputs a command signal in response to an operation command given by the player U to the game device 14. The input unit 16 includes a controller, keyboard, touch panel, pointing device, mouse, input button, or the like. Note that in the present embodiment, the player U who operates the input unit 16 will be described as a first player U1.

The output unit 18 is a display that displays a game image. The output unit 18 is a display for visual confirmation by the first player U1 during a game. The output unit 18 includes, for example, a known liquid crystal display (LCD), an organic electro-luminescence (EL), or the like. The output unit 18 may further have a speaker function that outputs sound, in addition to an image display function.

The game device 14 outputs an internal state of a game to the information processing device 12. Details of information (game status) to be output will be described later. In the present embodiment, the information processing device 12 is connected to the game device 14 and the input unit 16. In other words, the information processing device 12 is connected between the game device 14 and the input unit 16. Therefore, the input unit 16 transmits a command signal to the game device 14 via the information processing device 12.

The extraction device 10 extracts a specific phase of a game. The specific phase is a specific phase of a plurality of phases included in the game. Details of the specific phase will be described later. The extraction device 10 outputs a specific phase list including the extracted specific phase to the information processing device 12. The information processing device 12 outputs various information to the game device 14 on the basis of the specific phase included in the specific phase list acquired from the extraction device 10 (details will be described later).

Figure 2:
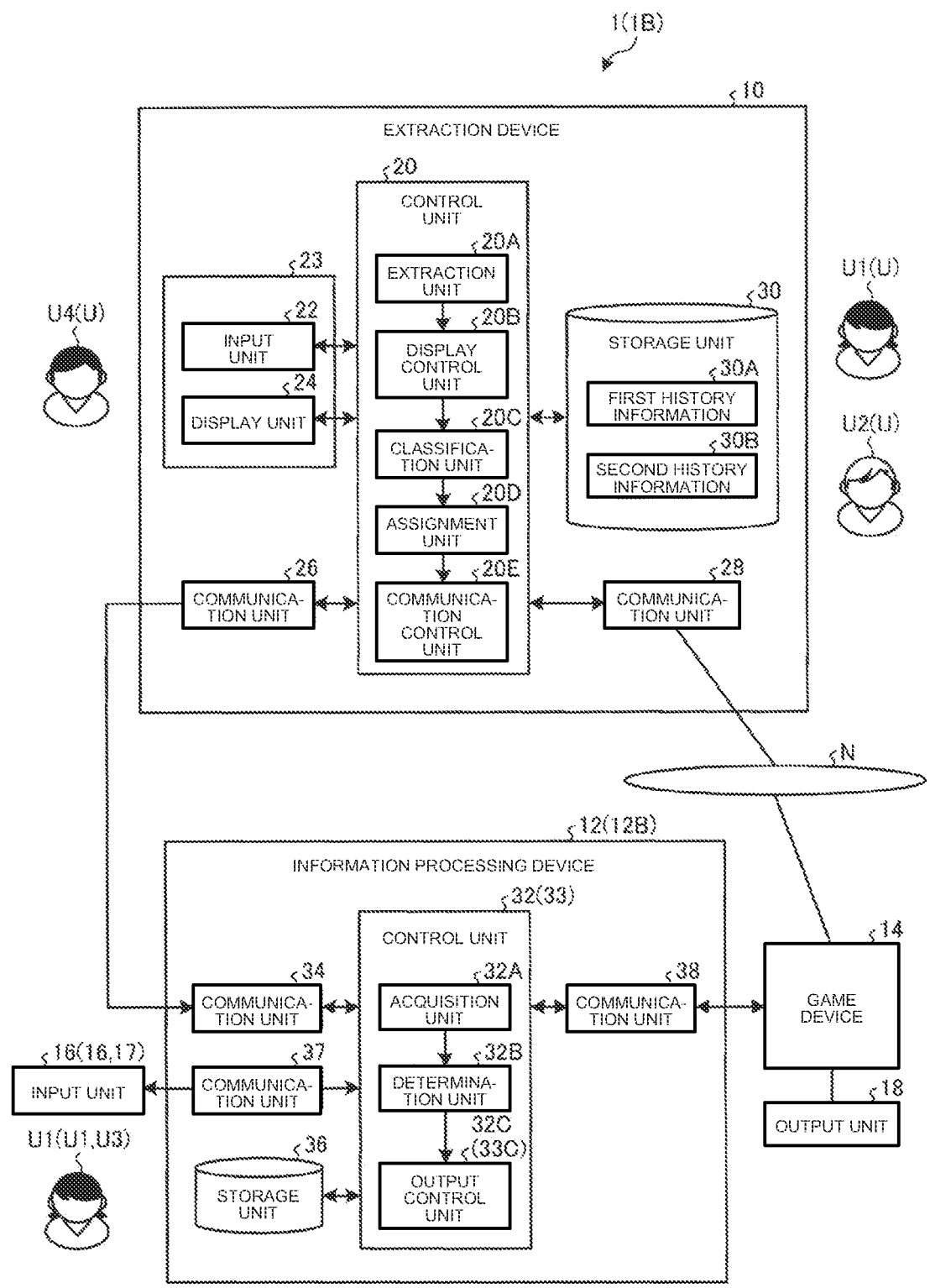
FIG. 2 is an example of a functional block diagram illustrating an extraction device and an information processing device according to the first embodiment of the present disclosure.

FIG. 2 is an example of a functional block diagram illustrating the extraction device 10 and the information processing device 12.

[Configuration of Extraction Device According to First Embodiment]

The extraction device 10 includes a control unit 20, a UI (user interface) unit 23, a communication unit 26, a storage unit 30, and a communication unit 28. The UI unit 23, the communication unit 26, the storage unit 30, and the communication unit 28 are connected to the control unit 20 so as to exchange data or signals.

The UI unit 23 receives various operations input by the player U and outputs various information. The UI unit 23 includes an input unit 22 and a display unit 24. The input unit 22 receives various operations input by the player U. The input unit 22 includes, for example, a keyboard, pointing device, mouse, input button, or the like. The display unit 24 displays various information. The display unit 24 includes an organic EL or LCD. Note that the input unit 22 and the display unit 24 may be integrally constituted to form a touch panel.

In the present embodiment, the UI unit 23 is operated by a fourth player U4. The fourth player U4 is a player who plays a role different from the first player U1. Note that the first player U1 may also serve as the fourth player U4. The fourth player U4 is, for example, an administrator of the information processing system 1. The UI unit 23 may be a terminal device carried by the fourth player U4. The terminal device includes a known personal computer, portable terminal, or the like. When the UI unit 23 is the terminal device, the control unit 20 preferably communicates with the UI unit 23 of the terminal device via the communication unit 28.

The communication unit 26 is a communication interface for directly communicating with the information processing device 12. The communication unit 28 is a communication interface for communicating with various devices such as the game device 14 via the network N.

The storage unit 30 stores various information. In the present embodiment, the storage unit 30 stores first history information 30A and second history information 30B.

The first history information 30A is information indicating a history of games played by the first player U1. The game history may be referred to as a game log. The second history information 30B is information indicating a history of games played by the second player U2. The second player U2 is a player U with a higher game learning level than the first player U1. Note that the history information (the first history information 30A and the second history information 30B) includes at least one or more, preferably, a plurality of game-play episodes.

The history information, such as the first history information 30A or the second history information 30B, is represented by a time-series set of game statuses. The game status represents information about an internal state of a game provided by a game program. Specifically, the game status is represented by, a screen output to the output unit 18, the position or activity state of a character or avatar that moves in response to an operation command given by a player U in a game, a state of a surrounding environment other than the character or avatar, a game score, and the like. The state of the surrounding environment includes the position or state of an object other than the character or avatar in the game, brightness, weather, or the like. Note that the game status changes depending on the type or content of a game and is not limited to the above description.

The game status changes according to a command signal input from the input unit 16 in response to an operation command given by a player U or the like. Specifically, such a process that the player U inputs for a certain game status a command signal, the game status transitions to a next game status in response to the command signal, and the player U inputs for the next game status a command signal is repeated, and the game proceeds in response to the operation commands given by the player U. In the following, a command signal from the first player U1 will be described as a first command signal. Furthermore, a command signal from the second player U2 will be described as a second command signal.

Figure 3:
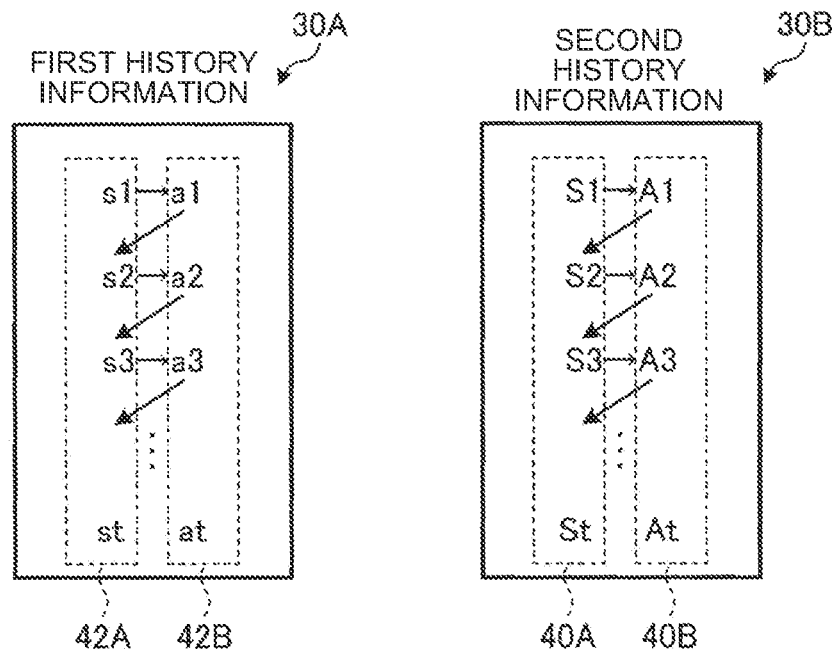
FIG. 3 is a schematic diagram illustrating an example of data configurations of first history information and second history information according to the first embodiment of the present disclosure.

FIG. 3 is a schematic diagram illustrating an example of data structures of the first history information 30A and the second history information 30B.

The first history information 30A includes a time-series set 42A of first game statuses st obtained by the first player U1. Timing is indicated by t. In the present embodiment, as an example, t is represented by an integer of 1 or more. Each of the first game statuses st indicates a game status changed in response to a first command signal at-1 (the last operation command) from the first player U1. Note that in the following description, the first command signal at-1 will be simply referred to as a first command signal at. Specifically, the time-series set 42A of first game statuses st is a time-series set of previous game statuses achieved by inputting the first command signals at to the game device 14 by the first player U1 in the past.

The first command signal at is a command signal from the first player U1. As described above, t indicates timing. Note that the first history information 30A may include both of the time-series set 42A of first game statuses st and a time-series set 42B of the first command signals at. In other words, the first history information 30A may include a plurality of pairs of the first game status st and the first command signal at. Furthermore, FIG. 3 illustrates an example of a plurality of pairs of (s1, a1), ..., and (st, at) as a pair of the first game status st and the first command signal at included in the first history information 30A. However, the first history information 30A may include a plurality of sets of sequences of (s1, a1), ..., and (st, at).

The second history information 30B includes a time-series set 40A of second game statuses St obtained by the second player U2. As described above, t indicates timing. Each of the second game status St indicates a game status changed in response to a second command signal At from the second player U2. The second command signal At is a command signal from the second player U2. As described above, t indicates timing.

Note that the second history information 30B may include both of the time-series set 40A of second game statuses St and a time-series set 40B of the second command signals At. In other words, the second history information 30B may include a plurality of pairs of the second game status St and the second command signal At. Furthermore, FIG. 3 illustrates an example of a plurality of pairs of (S1, A1), ..., and (St, St) as a pair of the second game status St and the second command signal At included in the second history information 30B. However, the second history information 30B may include a plurality of sets of sequences of (S1, S1), ..., and (St, St).

Returning to FIG. 2, the description will be continued. The extraction device 10 collects the first history information 30A and the second history information 30B from one or more game devices 14 or external devices via the network N and stores the history information in the storage unit 30.

The control unit 20 controls the extraction device 10. The control unit 20 includes an extraction unit 20A, a display control unit 20B, a classification unit 20C, an assignment unit 20D, and a communication control unit 20E.

Part or all of the extraction unit 20A, the display control unit 20B, the classification unit 20C, the assignment unit 20D, and the communication control unit 20E may be achieved, for example, by causing a processing device such as a CPU to execute a program, that is, by using software, may be achieved by using hardware such as an integrated circuit (IC), or may be achieved by using both of the software and the hardware.

The extraction unit 20A extracts a specific phase of a game on the basis of both of the first history information 30A and the second history information 30B.

The specific phase indicates a specific phase in the game. In the present embodiment, the specific phase is a phase as a learning target for the first player U1. Specifically, the specific phase is represented by a time-series set of game statuses. Note that the specific phase may represent a game status at a certain timing. In the present embodiment, as an example, a description is made of a case where a specific phase is represented by a time-series set of game statuses at each of a plurality of timings.

The extraction unit 20A extracts one or more specific phases and generates a specific phase list including one or more specific phases.

The specific phase list is represented by the following Formula (1).

$$\tau = \begin{cases} \tau_1 = (S_1^1, \ldots, S_{r^1}^1) \\ \vdots \\ \tau_n = (S_1^n, \ldots, S_{r^n}^n) \end{cases} \quad \text{Formula (1)}$$

In Formula (1), τ represents the specific phase list. In Formula (1), $\tau_1$ to $\tau_n$ each represent a specific phase (n is an integer of 1 or more). In Formula (1), S is a time-series set of second game statuses St belonging to each of a plurality of specific phases n. In other words, a specific phase is represented by a time-series set of second game statuses St.

The extraction unit 20A uses the time-series set 42A of first game statuses st shown in the first history information 30A and the time-series set 40A of second game statuses St shown in the second history information 30B to extract a specific phase.

Figure 4:
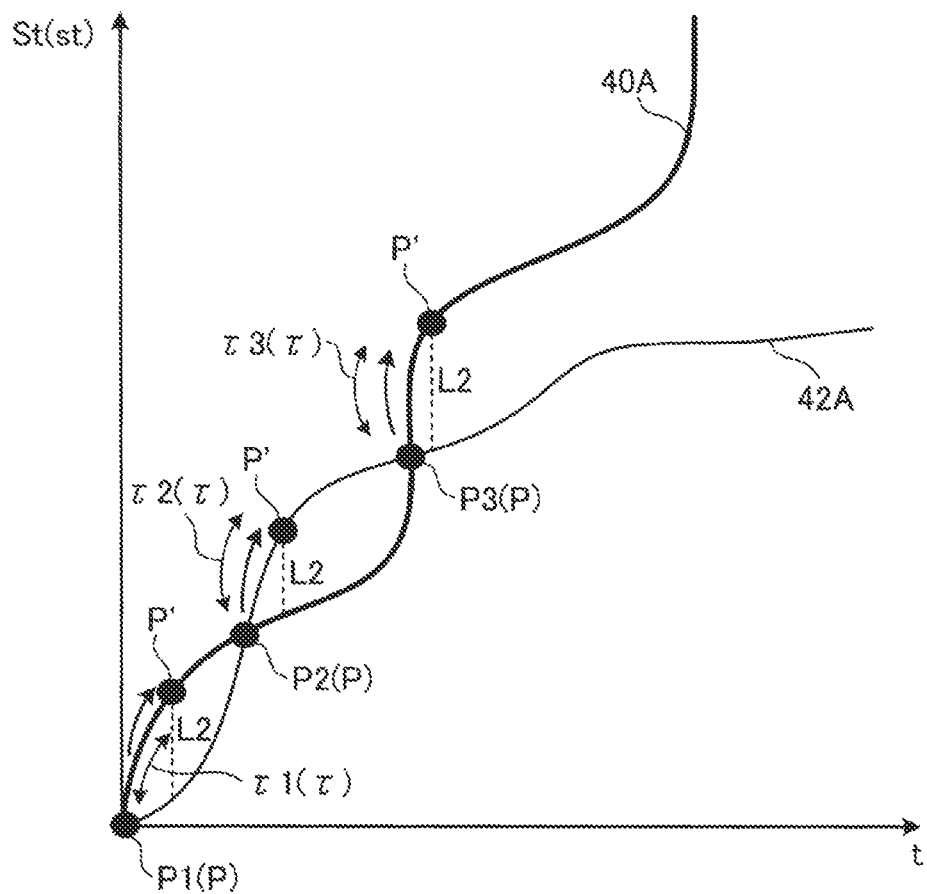
FIG. 4 is a graph illustrating extraction of a specific phase according to the first embodiment of the present disclosure.

FIG. 4 is a graph illustrating extraction of a specific phase. In some cases, the time-series set 40A of second game statuses St obtained according to second command signals from the second player U2 and the time-series set 42A of first game statuses st obtained according to first command signals from the first player U1 have a game status having a distance equal to or less than a first threshold. Specifically, in some cases, a second game status St achieved by an operation command given by the second player U2 with a higher learning level and a first game status st achieved by an operation command given by the first player U1 with a lower learning level have an approximate match.

Therefore, in the time-series set 40A of second game statuses St, the extraction unit 20A identifies a time point P where a distance to the time-series set 42A of first game statuses st is equal to or less than the first threshold. For the first threshold, an upper limit of the distance is preferably set at which a second game status St is considered to match a first game status st. In addition, the first threshold is preferably adjusted appropriately according to the content of a game, a skill level of the first player U1, or the like. Furthermore, for a distance between game statuses, a value derived from a predetermined function that measures a closeness between game statuses may be used. As the function that measures a closeness between game statuses, various functions can be considered depending on the characteristics of games. In a case where a game screen is used as a game status, the sum of squares of differences between screens can also be used. In some cases, the distance is calculated by paying attention only to some variables (e.g., the position coordinates of a main character) in a game status. In the example illustrated in FIG. 4, it is assumed that the extraction unit 20A identifies P1, P2, and P3, as the time point P where a value is equal to or less than the first threshold. Note that timing t of a game status corresponding to P1 is illustrated where a suffix is reset so that the value of t is identical in the time-series sets 40A and 42A.

Next, in the time-series set 40A of second game statuses St, the extraction unit 20A designates a range from the identified time point P where a value is equal to or less than the first threshold to a time point P' where a distance to the time-series set 42A of first game statuses st is equal to a second threshold (see distance L2 in FIG. 4) that is larger than the first threshold, as a specific phase τ.

The second threshold is preferably set in advance according to the content of a game, a skill level of the first player U1, or the like. Furthermore, at least one of the first threshold and the second threshold may be appropriately changeable according to an operation command or the like given by the player U.

In this way, in the time-series set 40A of second game statuses St, the extraction unit 20A extracts, as the specific phase τ, a phase during a period from the time point P where the distance to the time-series set 42A of first game statuses st of the first player U1 is equal to or less than the first threshold to the time point P' where the distance exceeds the second threshold that is larger than the first threshold. FIG. 4 illustrates an example where three specific phases τ (specific phase τ1 to specific phase τ3) are specified. Note that the number of specific phases τ specified by the extraction unit 20A is not limited to three.

Note that the length of each specific phase τ may be a fixed length or at least part of the plurality of specific phases τ may be different from each other.

In some cases, an evaluation function for evaluating a game status transition sequence is prepared. When a game is a drive game, the evaluation function evaluates, for example, lap time. In this case, the extraction unit 20A may extract, as a specific phase τ, a range of evaluation values of the time-series set 42A of first game statuses st shown in the first history information 30A where each of the evaluation values is equal to or less than a specific value, in the time-series set 40A of second game statuses St shown in the second history information 30B.

Returning to FIG. 2, the description will be continued. The display control unit 20B displays, on the display unit 24, a display screen including a list of the specific phases τ extracted by the extraction unit 20A.

Figure 5:
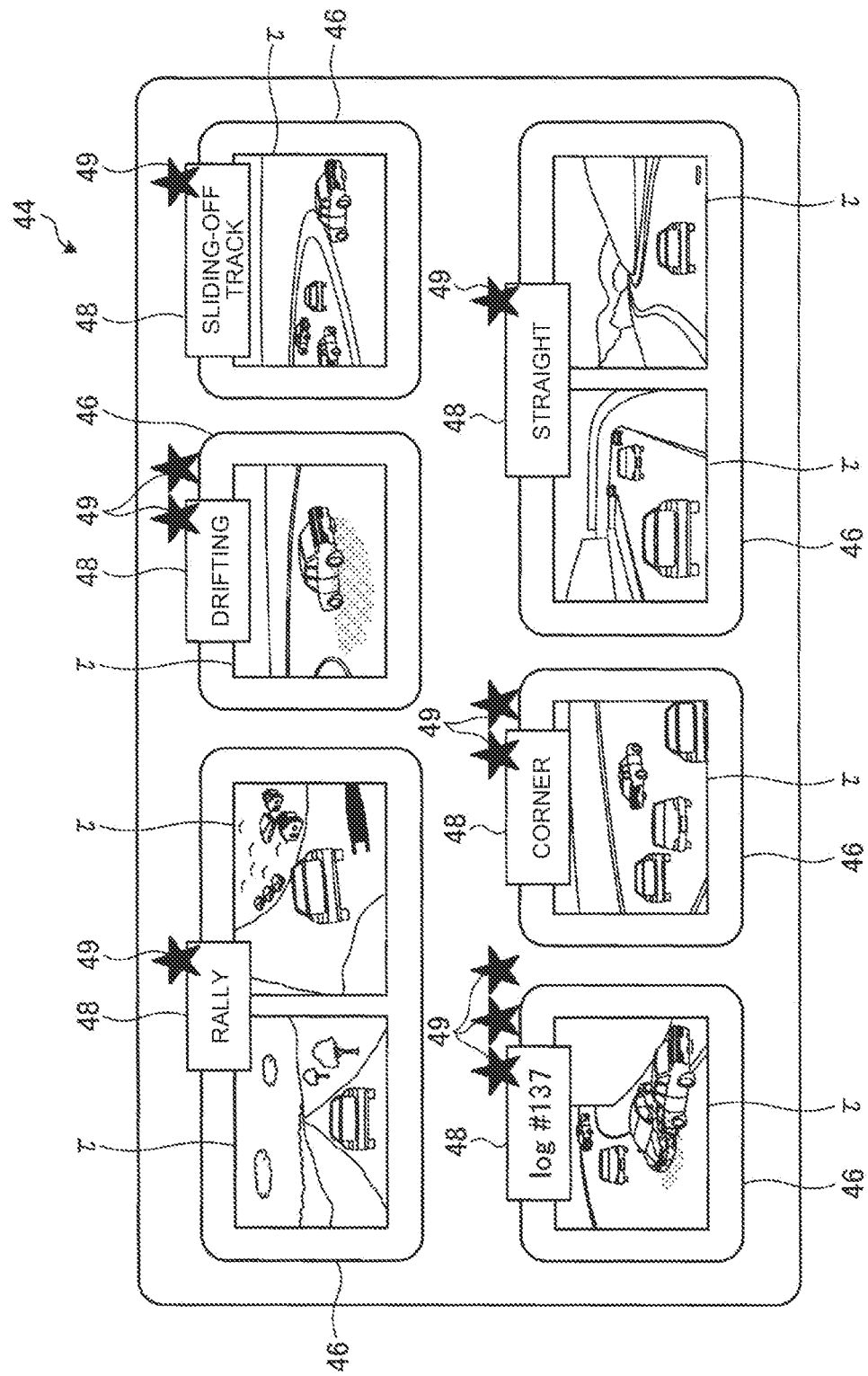
FIG. 5 is a schematic diagram illustrating an example of a display screen according to the first embodiment of the present disclosure.

FIG. 5 is a schematic diagram illustrating an example of a display screen 44. The display screen 44 includes images showing specific phases τ extracted by the extraction unit 20A. FIG. 5 illustrates, as an example, images showing eight specific phases τ.

As described above, the input unit 22 is operated by the fourth player U4. The fourth player U4 operates the input unit 22 to input a classification rule for clustering a plurality of specific phases τ into one or more clusters.

For example, the fourth player U4 operates the input unit 22 to draw a frame line 46 so that specific phases τ belonging to the same cluster is accommodated in the same frame. By this drawing operation, the classification rule is input to cluster the specific phases τ arranged inside the same frame line 46, as the specific phases τ belonging to the same cluster.

Furthermore, the fourth player U4 operates the input unit 22 to assign at least one of a label 48 and priority 49 to each cluster. The label 48 is information indicating the name of each cluster. The priority 49 indicates priority for the first player U1 to learn a specific phase τ belonging to a cluster to which the priority 49 is assigned. FIG. 5 illustrates, as an example, the priority rank is indicated by the number of stars.

Note that methods of inputting the classification rule for clustering, inputting to the display screen 44, and inputting the label 48 and priority 49 are not limited to the form illustrated in FIG. 5.

Returning to FIG. 2, the description will be continued. The classification unit 20C classifies a plurality of specific phases τ into at least one or more cluster according to the classification rule specified by the fourth player U4. Note that the classification unit 20C may classify the plurality of specific phases τ into at least one cluster according to a predetermined classification rule. A known classification rule is preferably used as the predetermined classification rule. For example, feature amounts of specific phases τ may be derived by a known method so that cluster specific phases τ having an approximate feature amount are clustered. Furthermore, the predetermined classification rule may be properly changed by an operation command or the like given by a player U.

The assignment unit 20D assigns at least one of the label 48 and the priority 49 to a cluster in response to a command from the fourth player U4. Note that the classification unit 20C may assign the label or priority according to the feature amount or the like of a specific phase τ. For example, the classification unit 20C may store labels 48 and priority 49 corresponding to feature amounts in advance, read a label 48 and priority 49 corresponding to a feature amount of a specific phase τ, and then assign these labels 48 and priority 49.

Next, the communication control unit 20E will be described. The communication control unit 20E transmits a specific phase list of specific phases τ extracted by the extraction unit 20A to the information processing device 12 via the communication unit 26. Note that the communication control unit 20E may transmit, to the information processing device 12, the specific phase list of specific phases τ, a result of the clustering, and at least one of the label 48 and the priority 49 that are assigned to the cluster. Referring to the assigned label 48 makes it easy to understand what meaning a group of the specific phases has, what kind of skill can be acquired by learning thereof, what attention is to be paid to during learning. Conversely, it is better to determine the label so that the above is achieved. The same applies to priority.

[Configuration of Information Processing Device According to First Embodiment]

Next, the information processing device 12 will be described.

The information processing device 12 includes a control unit 32, a communication unit 34, a storage unit 36, a communication unit 37, and a communication unit 38. The communication unit 34, the storage unit 36, the communication unit 37, the communication unit 38, and the control unit 32 are connected so as to exchange data or signals.

The communication unit 34 is a communication interface that communicates with the extraction device 10. The communication unit 37 is a communication interface that outputs a command signal from the input unit 16 to the control unit 32. The storage unit 36 stores various information. The communication unit 38 is a communication interface that communicably connects the control unit 32 and the game device 14.

The control unit 32 controls the information processing device 12. The control unit 32 includes an acquisition unit 32A, a determination unit 32B, and an output control unit 32C.

Part or all of the acquisition unit 32A, the determination unit 32B, and the output control unit 32C may be achieved, for example, by causing a processing device such as a CPU to execute a program, that is, by using software, may be achieved by using hardware such as an IC, or may be achieved by using both of the software and the hardware.

The acquisition unit 32A acquires a specific phase list of specific phases τ from the extraction device 10 via the communication unit 34. As described above, the specific phase τ is a phase as a learning target for the first player U1 who inputs an operation by using the input unit 16 to the game device 14 connected to the information processing device 12. Note that the acquisition unit 32A may acquire, from the extraction device 10, the specific phase list of specific phases τ, a result of clustering, and at least one of a label 48 and priority 49 that are assigned to a cluster.

At the start of a game, the first player U1 turns on the game device 14 to play a game and operates the input unit 16 to select a game program to be played. Then, the game device 14 starts execution of the game on the basis of the selected game program. The first player U1 operates the input unit 16 to input a first command signal at, and a first game status st of the game executed on the game device 14 changes in response to the first command signal at.

The determination unit 32B determines whether the current game status approaches a specific phase τ acquired by the acquisition unit 32A.

For example, when the game is a car racing game, the determination unit 32B determines that the current game status approaches the specific phase τ, when a difference between v coordinates (in some cases, also referred to as Frenet coordinates) of a course in the current game status and v coordinates of a course in the specific phase τ is equal to or less than a threshold.

Furthermore, the determination unit 32B may determine that the current game status approaches the specific phase τ, when a minimum error between a prediction result of predicting a game status later than the current game status and a second game status St in the specific phase τ is equal to or less than a threshold.

Furthermore, the determination unit 32B may determine that the current game status approaches the specific phase τ, in a case where there is a difference between the current game status and a second game status St that is provided at the first timing in a specific phase τ represented by a time-series set of second game statuses St and when a game status having the difference equal to or more than a predetermined distance is switched to a game status having the difference equal to or less than the predetermined distance.

Furthermore, for example, the determination unit 32B may make the determination by determining whether the current game status is provided at timing earlier for a predetermined time than timing at which the current game status changes to a game status shown in the specific phase τ.

Furthermore, the determination unit 32B may determine that the current game status approaches the specific phase τ when a signal indicating a second game status St in the target specific phase τ is received from outside.

When a game status approaches a specific phase τ, the output control unit 32C outputs, to the game device 14, guiding command information guiding to a reproduced game status where the specific phase τ is reproduced. In other words, the output control unit 32C outputs the guiding command information to the game device 14 when the determination unit 32B determines that the game status approaches the specific phase τ.

Figure 6:
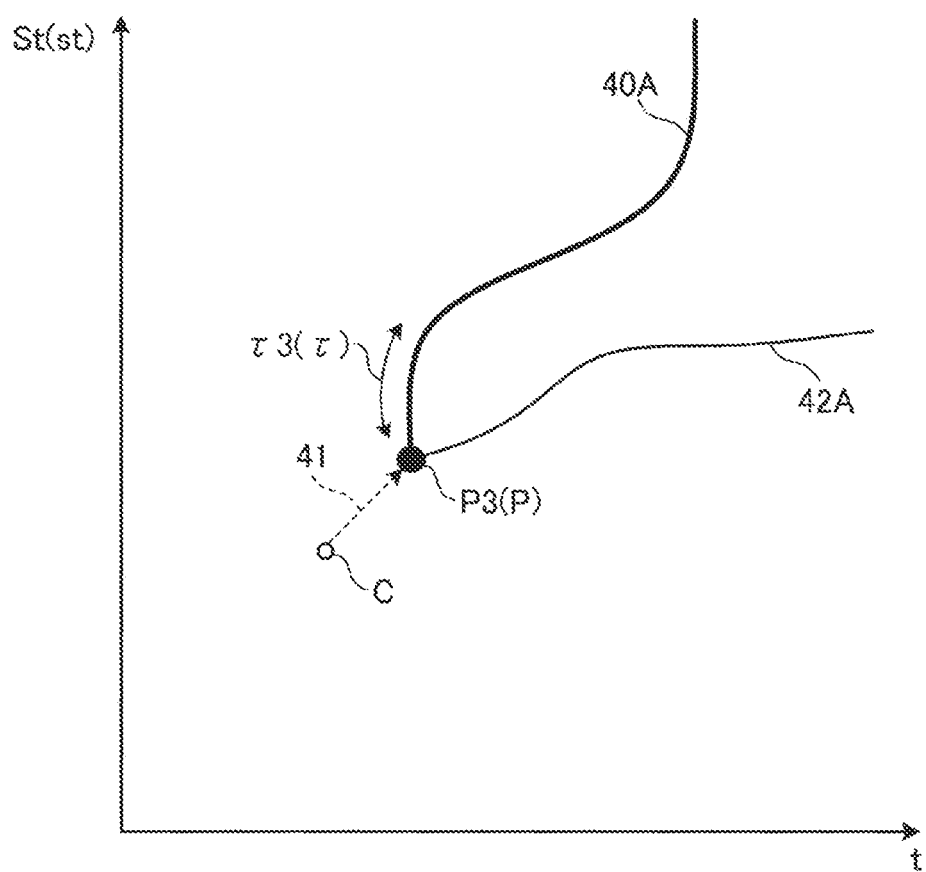
FIG. 6 is a graph illustrating an output of guiding command information according to the first embodiment of the present disclosure.

FIG. 6 is a graph illustrating an output of the guiding command information For example, it is assumed that a current game status C approaches the specific phase τ3. The specific phase τ3 is an example of the specific phase τ.

The reproduced game status represents a second game status St shown in a specific phase τ. In other words, the reproduced game status represents a game status that became a factor causing a phase deviated from a second game status St achieved by an operation command given by the second player U2 with a higher learning level, when the first player U1 played the game in the past.

Specifically, the reproduced game status represents second game statuses St corresponding to one or more time points (timings) within a specific phase τ represented by a time-series set of second game statuses St. For example, the reproduced game status represents a second game status St at the starting point of a specific phase τ represented by a time-series set of second game statuses St. In other words, in the time-series set 40A of second game statuses St of the second player U2, the reproduced game status represents the second game status St at a time point P where a distance to the time-series set 42A of first game statuses st in the past of the first player U1 is equal to or less than the first threshold. In this case, specifically, the reproduced game status where the specific phase τ3 in FIG. 6 is reproduced represents a second game status St at a time point P3 in the specific phase τ3. In the present embodiment, as an example, the reproduced game status that represents a second game status St at the starting point of a specific phase τ represented by a time-series set of second game statuses St will be described.

Then, the output control unit 32C outputs, to the game device 14, the guiding command information for guiding (see an arrow 41 in FIG. 6) the current game status C to the reproduced game status (in the example illustrated in FIG. 6, second game status St at the time point P3 in the specific phase τ3).

The guiding command information is preferably information including at least one of a correction command signal at' and game status changing command information, the correction command signal at' causing the current game status C to change in a direction approaching the reproduced game status is obtained by correcting the first command signal at for a game status received from the first player U1, and the game status changing command information changes the game status in a direction approaching the reproduced game status.

For example, when the current game status C approaches a specific phase τ, the output control unit 32C corrects the first command signal at received from the input unit 16 before reaching the specific phase τ to the correction command signal at' causing the current game status C to change in a direction the current game status C in a direction approaching a reproduced game status at a time point P, and outputs the corrected correction command signal to the game device 14.

Therefore, when the current game status C approaches the specific phase τ, instead of the first command signal at in response to the operation command input to the input unit 16 by the first player U1, the correction command signal at' for causing the current game status C to approach the reproduced game status is output to the game device 14.

Furthermore, for example, when the current game status C approaches the specific phase τ, the output control unit 32C may output the game status changing command information changing the current game status C in a direction approaching the reproduced game status, to the game device 14.

As described above, when the current game status C approaches the reproduced game status, the output control unit 32C of the game device 14 outputs, instead of the first command signal at received from the input unit 16 in response to an operation command given by the first player U1, the guiding command information including at least one of the correction command signal at' obtained by correcting the first command signal at and the game status changing command information, to the game device 14.

Therefore, when the current game status C approaches the specific phase τ as the learning target for the first player U1, the game device 14 provides a reproduced game status where the specific phase τ that first player U1 needs to learn is reproduced. Therefore, it is easy to train the first player U1 for the specific phase τ where a past history of first game statuses st is quite different from a history of second game statuses St achieved by the second player U2 with a higher learning level.

Note that sudden change of the game status to the reproduced game status may cause the first player U1 to feel uncomfortable. Therefore, the output control unit 32C preferably outputs, to the game device 14, the guiding command information stepwise or continuously guiding the current game status C to the reproduced game status.

Specifically, the output control unit 32C gradually reduces an error to zero over n steps, from the current game status C to the reproduced game status. Note that n is an integer of 1 or more.

To achieve this, for example, the following configuration can be provided. The output control unit 32C calculates a target first game status $(st+k)+(S-(st+k))/(n-k+1)$ in each time step k ($k=1, 2, \ldots,$ and n) so that an error between a first game status st and a target reproduced game status S is gradually reduced to 0 over n steps. Note that S represents a reproduced game status. Furthermore, k represents an index indicating each step of the n steps until the reproduced game status which is the final goal is achieved.

Then, the output control unit 32C determines guiding command information to be output to the game device 14 in each step by calculating a correction command signal at' that achieves a target first game status in each step. In other words, the output control unit 32C replaces a first command signal at received from the input unit 16 in response to an operation command given by the first player U1, with a correction command signal at' and outputs the correction command signal at' as the guiding command information.

Note that, in each step, the output control unit 32C may perform feedback control to the target first game status corresponding to each step and output, to the game device 14, the guiding command information guiding the current game status C to the reproduced game status stepwise or continuously. The feedback control preferably employs a known proportional-integral-differential (PID) control or the like.

Note that the output control unit 32C designates a specific phase τ belonging to a cluster having a higher priority 49 in priority to a specific phase τ belonging to a cluster having a lower priority 49 and outputs the guiding command information to the game device 14 when the current game status C approaches the designated specific phase τ.

In addition, at the beginning of a game, the game device 14 may display, on the output unit 18, a display screen (e.g., the display screen 44 illustrated in FIG. 5) including a list of specific phases τ included in the game, a cluster to which the specific phase τ belongs, a label 48 and priority 49 assigned to the cluster.

Displaying the display screen on the output unit 18 by the game device 14 makes it easy to show the first player U1 whether a specific phase τ included in a game to be executed has what kind of content to be learned and what kind of priority.

Note that when the output control unit 32C determines that the game status has reached the specific phase τ, the output control unit 32C finishes output of the guiding command information to the game device 14. In other words, the output control unit 32C starts output of the guiding command information to the game device 14 when the current game status C approaches the specific phase τ, and finishes output of the guiding command information to the game device 14 when the current game status C reaches a second game status St (reproduced game status in the present embodiment) at the starting point of the specific phase τ.

Note that the output control unit 32C may finish output of the guiding command information to the game device 14 when a predetermined time has passed after it is determined that the current game status C approaches the specific phase τ. For example, the output control unit 32C may finish the output of the guiding command information to the game device 14, after the steps of the specific phase τ have passed, the steps, the number of which is obtained by adding a predetermined number of steps to the steps of the specific phase τ, have passed, or the steps, the number of which is a constant multiple of the number of steps of the specific phase τ, have passed after it is determined that the current game status C approaches the specific phase τ.

Furthermore, when all of the time-series sets of game statuses after entering the specific phase τ are away from the current game status C by a distance of a threshold or more, the output control unit 32C may determine that the guiding is impossible so that the output of the guiding command information to the game device 14 is stopped. For this distance, a value derived from a function used for the distances of the first threshold and the second threshold is preferably used.

Furthermore, the output control unit 32C may stop the output of the guiding command information to the game device 14 when the game status has a second game status St at the end point of the specific phase τ.

[Procedure of Extraction Processing According to First Embodiment]

Next, an example of a procedure of extraction processing performed by the extraction device 10 will be described.

Figure 7:
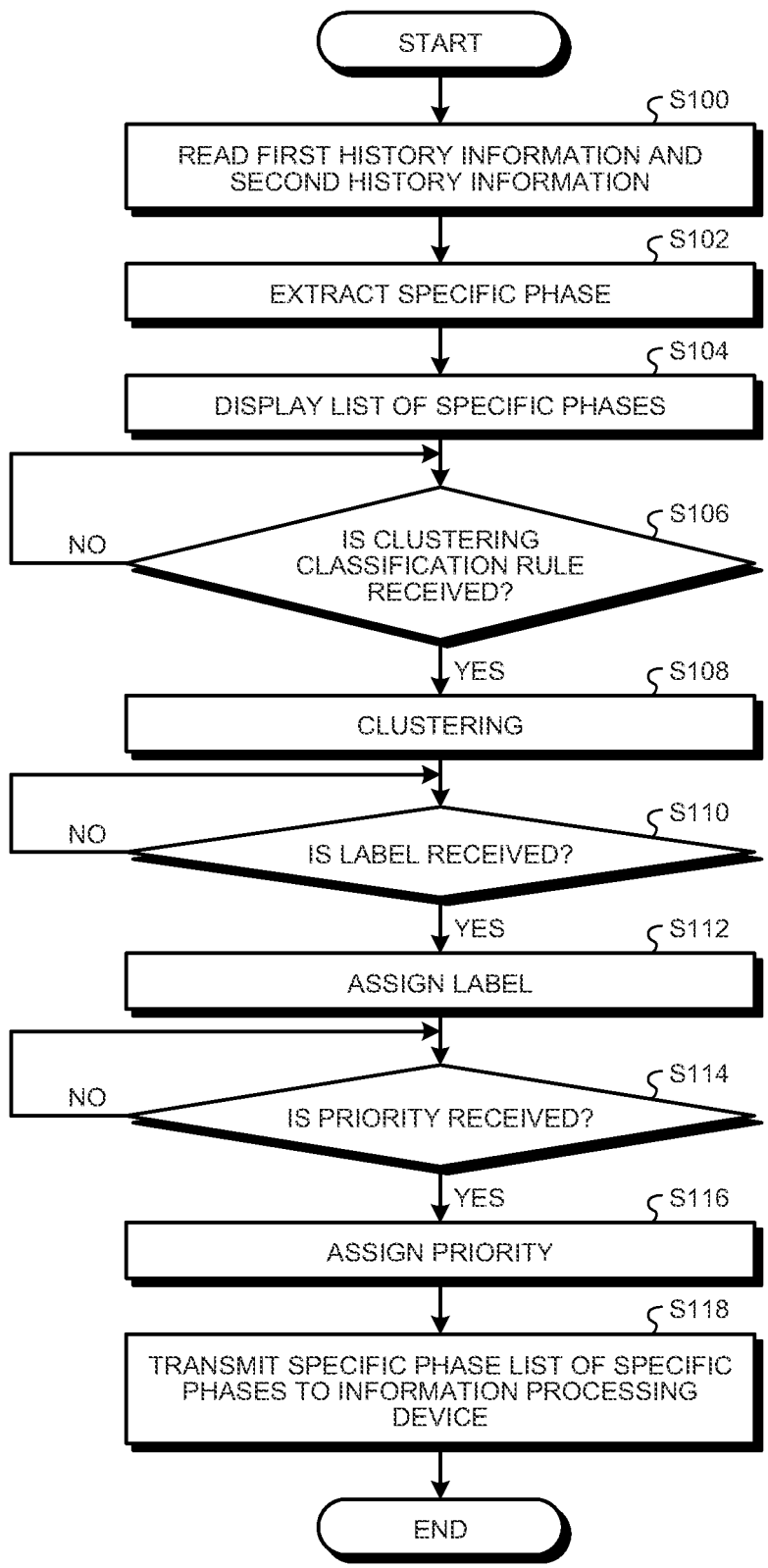
FIG. 7 is a flowchart illustrating an example of a procedure of extraction processing according to the first embodiment of the present disclosure.

FIG. 7 is a flowchart illustrating an example of the procedure of extraction processing performed by the extraction device 10.

First, the extraction unit 20A reads the first history information 30A and the second history information 30B from the storage unit 30 (Step S100).

Next, the extraction unit 20A extracts specific phases τ on the basis of the first history information 30A and the second history information 30B read in Step 100 (Step S102).

Next, the display control unit 20B displays a display screen including a list of the specific phases τ extracted in Step 102, on the display unit 24 (Step S104). The classification unit 20C repeats the negative determination until it is determined that a classification rule for clustering is received from the input unit 22 (Step S106: No). Then, if the classification rule is received (Step S106: Yes), the classification unit 20C clusters the specific phases τ extracted in Step S102 on the basis of the received classification rule (Step S108).

Next, the assignment unit 20D repeats the negative determination until it is determined that labels 48 for clusters are received from the input unit 22 (Step S110: No). If the labels 48 are received (Step S110: Yes), the assignment unit 20D assigns the received labels 48 to the corresponding clusters (Step S112).

Next, the assignment unit 20D repeats the negative determination until it is determined that priority 49 for the clusters is received from the input unit 22 (Step S114: No). If the priority 49 is received (Step S114: Yes), the assignment unit 20D assigns the received priority 49 to the corresponding clusters (Step S116).

Next, the communication control unit 20E transmits a specific phase list of the specific phases τ extracted in Step S102 to the information processing device 12 via the communication unit 26 (Step S118). Note that the communication control unit 20E may transmit, to the information processing device 12, the specific phase list of the specific phases τ, a result of the clustering performed in Step S108, and at least one of the labels 48 and the priority 49 that are assigned to the clusters in Step S112 and Step S116. Then, this routine is finished.

[Procedure of Information Processing According to First Embodiment]

Next, an example of a procedure of information processing performed by the information processing device 12 will be described.

Figure 8:
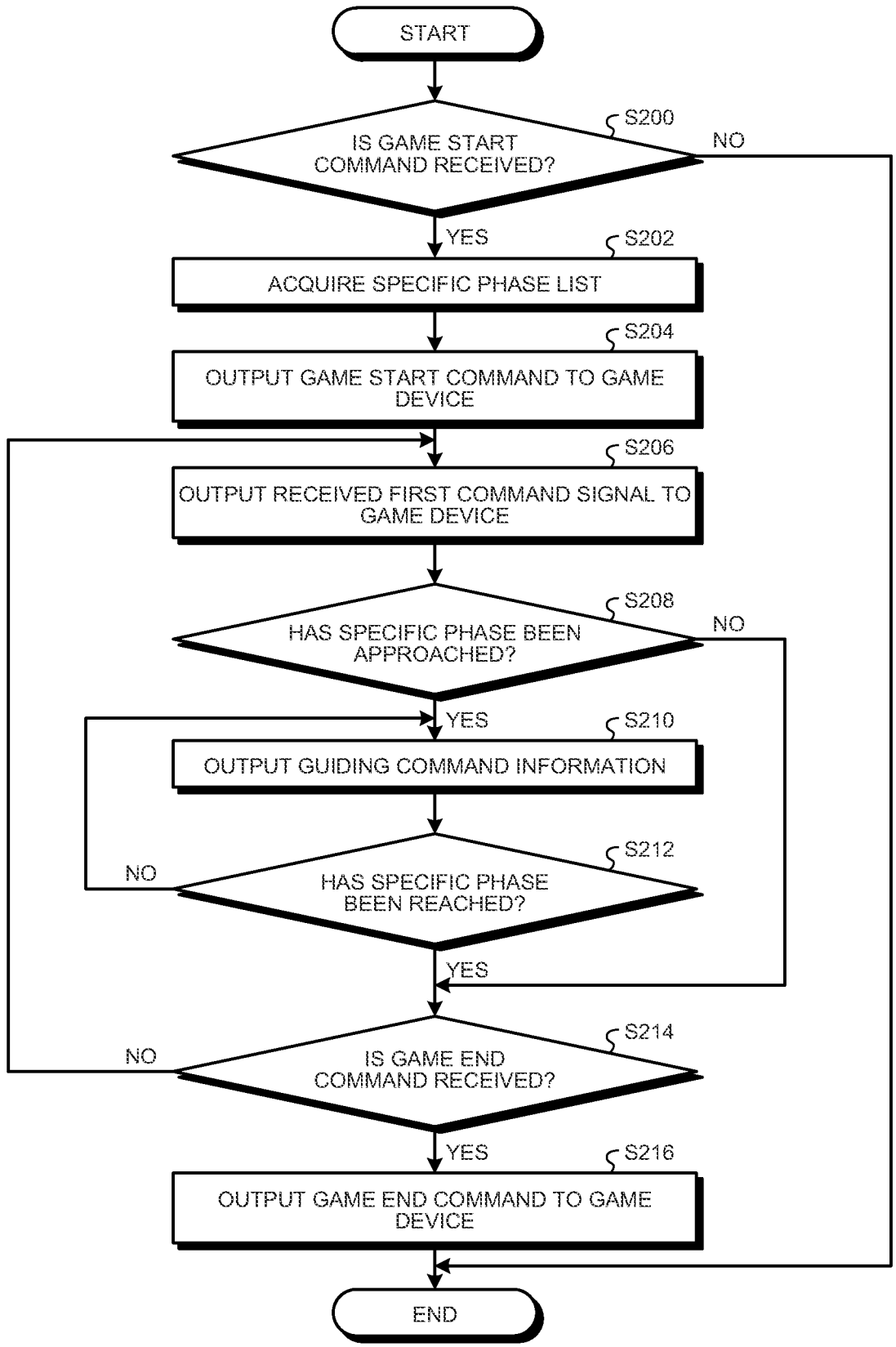
FIG. 8 is a flowchart illustrating an example of a procedure of information processing according to the first embodiment of the present disclosure.

FIG. 8 is a flowchart illustrating an example of the procedure of information processing performed by the information processing device 12.

First, the acquisition unit 32A of the information processing device 12 determines whether a game start command has been received from the input unit 16 (Step S200). If a negative determination is made in Step S200 (Step S200: No), this routine is finished. On the other hand, if an affirmative determination is made in Step S200 (Step S200: Yes), the process proceeds to Step S202.

In Step S202, the acquisition unit 32A acquires a specific phase list of specific phases τ from the extraction device 10 via the communication unit 34 (Step S202). Note that the acquisition unit 32A may acquire, from the extraction device 10, the specific phase list of specific phases τ, a result of clustering, and at least one of a label 48 and priority 49 that are assigned to a cluster.

Next, the acquisition unit 32A outputs the game start command received in Step S200 to the game device 14 (Step S204).

Then, if receiving a first command signal at from the input unit 16, the output control unit 32C outputs the first command signal at to the game device 14 via the communication unit 38 (Step S206). The game device 14 changes a game status according to the first command signal at. This process makes the game progress according to an operation command from the first player U1.

Next, the determination unit 32B determines whether the current game status C has approached the specific phase τ acquired in Step S202 (Step S208). If a negative determination is made in Step S208 (Step S208: No), the process proceeds to Step S214 which is described later. If an affirmative determination is made in Step S208 (Step S208: Yes), the process proceeds to Step S210.

In Step S210, the output control unit 32C outputs, to the game device 14, guiding command information guiding to a reproduced game status where a specific phase τ is reproduced, for the specific phase τ to which the current game status C is determined to have approached in Step S208 (Step S210).

Next, the output control unit 32C determines whether the current game status C reaches the first timing of the specific phase τ to which the current game status C is determined to have approached in Step S208 (Step S212). If a negative determination is made in Step S212 (Step S212: No), the process returns to Step S210 described above. On the other hand, if an affirmative determination is made in Step S212 (Step S212: Yes), the process proceeds to Step S214.

In the processing of Steps S206 to S212, when the current game status C of the running game approaches the specific phase τ, the game device 14 receives the guiding command information guiding to the reproduced game status of the specific phase τ and changes the game status to a second game status St at the first time point P of the specific phase τ stepwisely or continuously.

Next, the acquisition unit 32A determines whether a game end command has been received from the input unit 16 (Step S214). If a negative determination is made in Step S214 (Step S214: No), the process returns to Step S206 described above. Therefore, when entering the specific phase τ, the output control unit 32C directly outputs the first command signal at received from the input unit 16 to the game device 14 via the communication unit 38 (Step S206). In other words, when entering the specific phase τ, the output control unit 32C outputs no guiding command information to the game device 14.

On the other hand, if an affirmative determination is made in Step S214 (Step S214: Yes), the process proceeds to Step S216.

In Step S216, the output control unit 32C outputs the game end command to the game device 14 via the communication unit 38 (Step S216), and this routine is finished.

As described above, the information processing device 12 according to the present embodiment includes the output control unit 32C. When a game status approaches a specific phase τ, the output control unit 32C outputs, to the game device 14, guiding command information guiding to a reproduced game status where the specific phase τ is reproduced.

Incidentally, training content provided for acquire a technique step by step has been conventionally prepared to improve the learning level of a player U. For example, in a drive game, separate training content, such as a method for smooth acceleration or a method for entering a corner has been separately prepared. However, the training content is uniform, and it has been difficult to effectively support improvement in learning level. Furthermore, a training environment is merely provided to the player U and may lack in game experience and entertainment for the player U. In other words, it has been difficult for the conventional content to effectively support the improvement in learning level.

On the other hand, in the present embodiment, when a game status approaches the specific phase τ, the output control unit 32C outputs, to the game device 14, the guiding command information guiding to the reproduced game status where the specific phase τ is reproduced.

Therefore, when a game status achieved by the game device 14 approaches a specific phase τ, the game status is guided to a reproduced game status where the specific phase τ is reproduced. Therefore, the player U can be naturally trained in the specific phase τ.

Thus, the information processing device 12 according to the present embodiment can effectively support the improvement in game learning level.

Furthermore, the player U can be naturally trained for the specific phase τ, and thereby the information processing device 12 according to the present embodiment can improve the game experience and entertainment of the player U, in addition to the above effects.

Furthermore, the extraction unit 20A of the extraction device 10 extracts a specific phase τ of a game on the basis of the first history information 30A indicating the time-series set 42A of first game statuses st of the first player U1 and the second history information 30B indicating the time-series set 40A of second game statuses St of the second player U2 with a higher learning level than the first player U1.

Therefore, the extraction unit 20A is capable of accurately extracting a specific phase τ that needs to be learned by the first player U1. Furthermore, the information processing device 12 uses the specific phase τ extracted by the extraction unit 20A to output, to the game device 14, the guiding command information guiding to a reproduced game status where a specific phase τ corresponding to the level of the first player U1 is reproduced.

Therefore, the information processing device 12 according to the present embodiment can support the improvement in learning level according to the level of the first player U1, in addition to the above effects.

Furthermore, in the present embodiment, the output control unit 32C outputs, to the game device 14, guiding command information that stepwisely or continuously guides the game status toward the reproduced game status. Therefore, the guiding command information is configured to suppress rapid change of the game status, and a player U can be naturally trained for a specific phase τ without causing the player U to feel a sense of discomfort.

Furthermore, use of a phase as the learning target for first player U1 as the specific phase τ makes it possible for the information processing device 12 to support the improvement in learning level according to the level of the first player U1, in addition to the above effects.

Furthermore, in a time-series set of second game statuses of the second player U2 with a higher learning level than the first player U1, the specific phase τ is a phase ranging from a time point P where the distance to a time-series set of first game statuses st in the past of the first player U1 is equal to or less than the first threshold to a time point P' where the distance exceeds the second threshold that is larger than the first threshold. Therefore, when the first player U1 has played a game in the past, the information processing device 12 is configured to use, as a specific phase τ, a phase that is deviated from a second game status St achieved by a second command signal from the second player U2 with a higher learning level. Therefore, the information processing device 12 is capable of accurately identifying as the specific phase τ a phase that can be learned better by the first player U1 and using the phase to support the improvement in learning level, in addition to the above effects.

Furthermore, the output control unit 32C outputs, to the game device 14, the guiding command information including at least one of a correction command signal at' and game status changing command information, the correction command signal at' causing the game status to change in a direction approaching the reproduced game status is obtained by correcting the first command signal at received from the first player U1, and the game status changing command information changes the game status in a direction approaching the reproduced game status.

Therefore, when the game status approaches a specific phase τ, the first command signal at input by the first player U1 by operating the input unit 16 is corrected to the correction command signal at' by the information processing device 12 and output to the game device 14. Therefore, the first player U1 is naturally guided to the reproduced game status by normally operating the input unit 16.

Therefore, the information processing device 12 according to the present embodiment can naturally support the improvement in learning level, in addition to the above effects.

Furthermore, the classification unit 20C of the extraction device 10 classifies a plurality of specific phases τ into at least one cluster according to a classification rule specified by the fourth player U4. The assignment unit 20D assigns at least one of the label 48 and the priority 49 to a cluster in response to a command from the fourth player U4.

Therefore, the fourth player U4, such as an administrator, different from the first player U1 is capable of performing clustering or assigning a label 48 and priority 49 according to the first player U1.

Furthermore, as described above, at the beginning of a game, the game device 14 may display, on the output unit 18, a display screen (e.g., the display screen 44 illustrated in FIG. 5) including a list of specific phases τ included in a game, a cluster to which a specific phase τ belongs, a label 48 and priority 49 assigned to the cluster.

Displaying the display screen on the output unit 18 by the game device 14 makes it easy to show a player U whether a specific phase τ included in a game to be executed has what kind of content to be learned and what kind of priority.

Furthermore, when a game executed in the game device 14 is content in which the game is advanced by moving a character or an avatar in the game, displaying the display screen makes it possible to readily provide a learning status of the character or avatar in the game to a player U. Furthermore, the information processing device 12 can support efficient learning of the character or avatar in the game to efficiently grow the character or avatar in the game or improve the game experience of a player U.

Modification of First Embodiment

Note that in the above embodiment, an example where the player U is a person has been described. However, the player U may be a computer that outputs, to the game device 14, a command signal for shifting a game status according to the game status.

Figure 9:
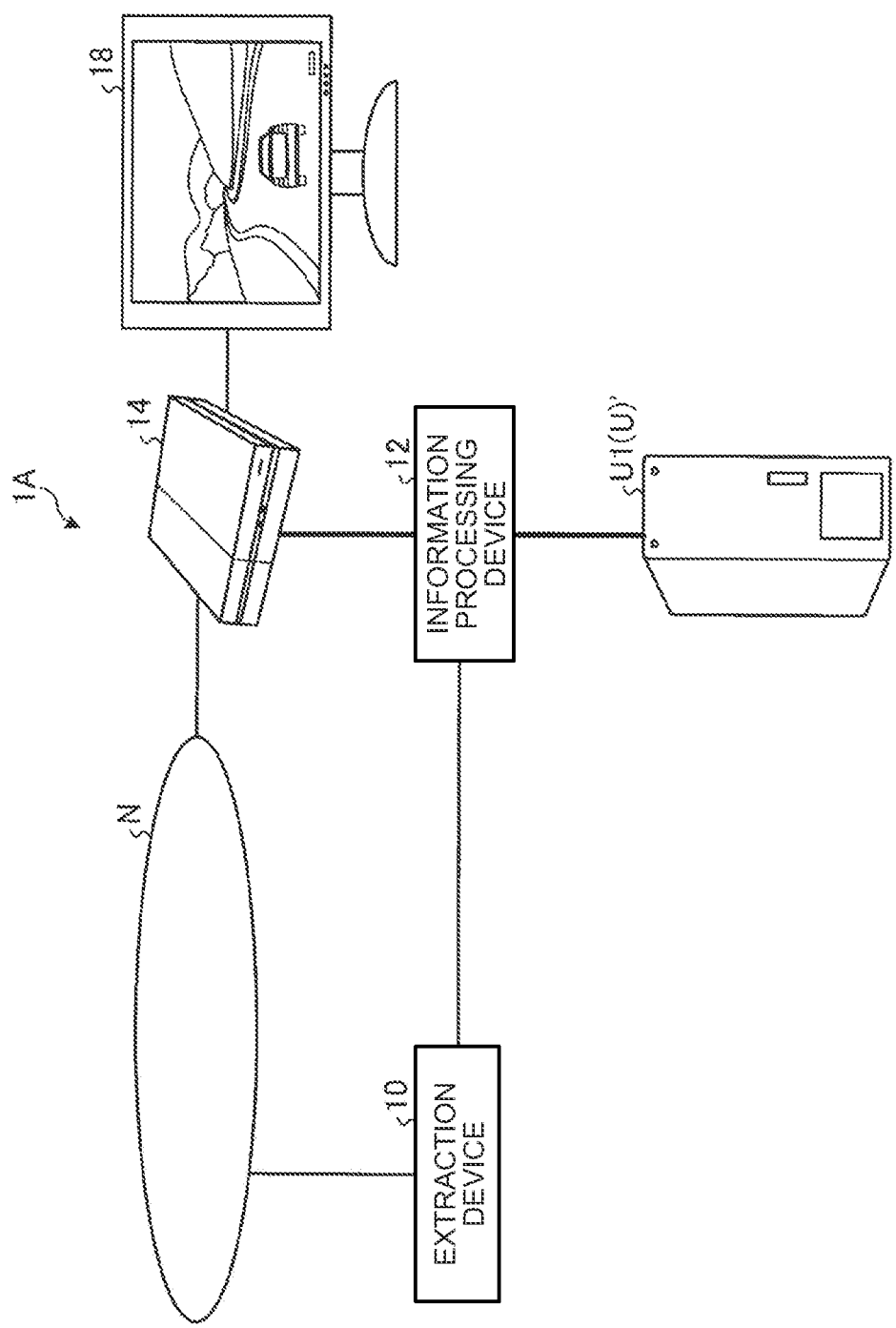
FIG. 9 is a schematic diagram illustrating an example of an information processing system according to a modification of the first embodiment of the present disclosure.

FIG. 9 is a schematic diagram illustrating an example of an information processing system 1A according to the present modification.

The information processing system 1A includes the extraction device 10, the information processing device 12, the game device 14, the output unit 18, and a computer U'. The extraction device 10, the information processing device 12, the game device 14, and the output unit 18 are configured similarly to those in the first embodiment.

In the present modification, the computer U' is provided instead of the input unit 16. The computer U' is an example of the first player U1.

The computer U' is a device that inputs a first command signal for a game status achieved on the game device 14. The computer U' includes, for example, a learning device or the like that learns an optimum command signal or the like to be output for a game status.

As described above, the player U is not limited to a person and may be a computer. When the player U is the computer, the game status is acquired by communication via the information processing device 12, and thus, the output unit 18 is not always necessary.

Note that, also in the information processing system 1A, the extraction device 10 and the information processing device 12 perform processing similar to that in the first embodiment.

Therefore, even when the player U is the computer U', it is possible to effectively support the improvement in game learning level.

Here, when the computer U' is a device that learns an optimum command signal or the like output for a game status, a major factor that influences the learning performance is data used for learning. In particular, it is known that particularly large amount of data is required in reinforcement learning such as a game. This is because the game includes a plurality of types of classification, a plurality of types of identification or prediction, and a complicated task as compared with a regression problem.

As a conventional method of collecting a large amount of data, there is known a method of collecting user's game log to be used for learning. However, in a conventional method, it has been difficult to collect all game log of various users and under various situations, and thus, it has been difficult to learn an optimum command signal.

Furthermore, in a conventional method, it has been difficult to learn an optimum command signal or the like while avoiding unnatural transition of a game status that impairs the game experience of the player U and entertainment and while naturally reproducing a phase to be learned by the player U.

On the other hand, when a game status approaches a specific phase τ, the information processing device 12 of the information processing system 1A according to the present modification outputs, to the game device 14, the guiding command information guiding to the reproduced game status where the specific phase τ is reproduced. Therefore, the computer U' as the first player U1 can naturally learn the specific phase τ.

Therefore, even when the player U is the computer U', the information processing device 12 according to the present embodiment can effectively support the improvement in game learning level.

Second Embodiment

In the first embodiment, the information processing device 12 outputs the guiding command information to the game device 14 when the current game status C approaches a specific phase τ. Therefore, when the current game status C of a running game approaches the specific phase τ, the game device 14 changes the game status toward a second game status St at the first time point P of the specific phase τ stepwisely or continuously.

On the other hand, in the present embodiment, a mode will be described in which a third command signal in response to an operation command given by the third player U3 with a higher learning level than the first player U1 is output to the game device 14, for the duration of a specific phase τ.

[Configuration of Information Processing System According to Second Embodiment]

Figure 10:
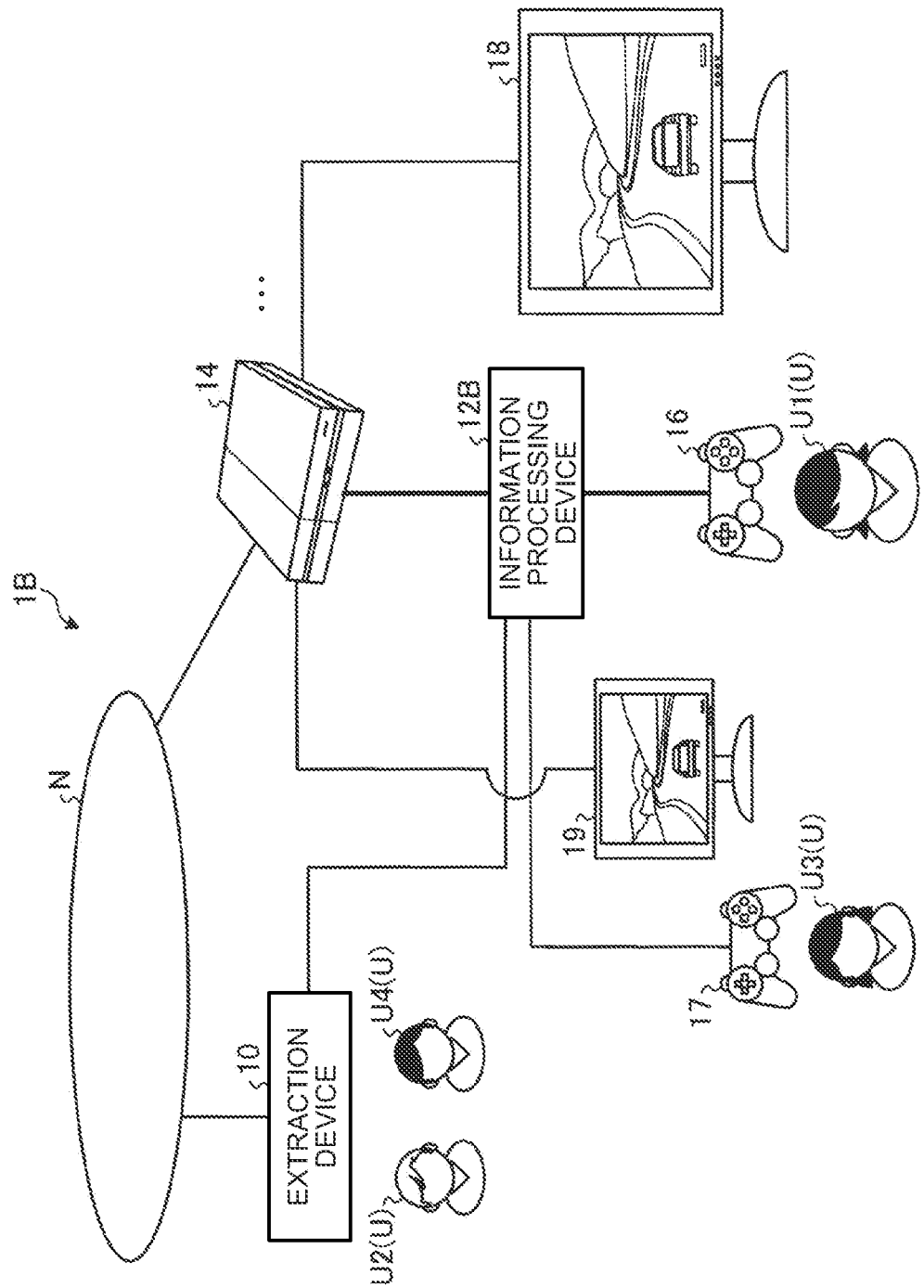
FIG. 10 is a schematic diagram illustrating an example of an information processing system according to a second embodiment of the present disclosure.

FIG. 10 is a schematic diagram illustrating an example of an information processing system 1B according to the present embodiment.

The information processing system 1B includes the extraction device 10, an information processing device 12B, and a game device 14. The output unit 18 and an output unit 19 are connected to the game device 14. Furthermore, the input unit 16 and an input unit 17 are connected to the game device 14 via the information processing device 12B in a wired or wireless manner. The extraction device 10 and the game device 14 are communicably connected via a network N. The extraction device 10 and the information processing device 12B are directly connected via a connection cable so as to be communicated with each other. The extraction device 10 and the information processing device 12B may be wirelessly connected. Furthermore, the extraction device 10 and the information processing device 12B may be communicably connected via the network N.

The extraction device 10, the game device 14, the input unit 16, and the output unit 18 are configured similarly to those in the first embodiment.

The input unit 17 is an input interface device for the third player U3 to input an operation to the game device 14. The third player U3 is a player U with a higher game learning level than the first player U1. The third player U3 may be a player U with a lower game learning level than the second player U2.

The input unit 17 outputs, to the information processing device 12, a third command signal in response to an operation command given by the third player U3. The input unit 17 includes a controller, keyboard, touch panel, pointing device, mouse, input button, or the like. The output unit 19 is a display that displays a game image from the game device 14. The output unit 19 is a display for visual confirmation by the third player U3 during a game. The output unit 19 includes, for example, a known LCD or organic EL. The output unit 19 may further have a speaker function that outputs sound, in addition to an image display function.

The information processing device 12B outputs various information to the game device 14, in a manner similar to the information processing device 12 according to the first embodiment

[Configuration of Information Processing Device According to Second Embodiment]

FIG. 2 is an example of a functional block diagram illustrating the extraction device 10 and the information processing device 12B of the information processing system 1B. The configuration of the extraction device 10 is configured similarly to those in the first embodiment.

The information processing device 12B includes a control unit 33, the communication unit 34, the storage unit 36, the communication unit 37, and the communication unit 38. The information processing device 12B has a configuration similar to that of the information processing device 12 according to the first embodiment, except that the information processing device 12B includes the control unit 33 instead of the control unit 32 and that the communication unit 37 receives a command signal from the input unit 16 and the input unit 17.

The control unit 33 controls the information processing device 12B. The control unit 33 includes the acquisition unit 32A, the determination unit 32B, and an output control unit 33C. The acquisition unit 32A and the determination unit 32B are similar to those of the information processing device 12 according to the first embodiment.

When a game status approaches a specific phase $\tau$, the output control unit 33C outputs, to the game device 14, the guiding command information guiding to the reproduced game status where the specific phase $\tau$ is reproduced, in a manner similar to the output control unit 32C according to the first embodiment.

Furthermore, In the present embodiment, for the duration of the specific phase $\tau$, the output control unit 33C outputs, to the game device 14, the third command signal received from the third player U3 with a higher learning level than the first player, instead of a first command signal at received from the first player U1.

Therefore, in the present embodiment, when the current game status C approaches the specific phase $\tau$, instead of the first command signal at in response to an operation command input to the input unit 16 by the first player U1, a correction command signal at' for causing the current game status C to approach the game status where the specific phase $\tau$ is reproduced is output to the game device 14.

Then, when entering the specific phase $\tau$, for the duration of the specific phase $\tau$, the output control unit 32C does not receive the first command signal at in response to an operation command given by the first player U1 from the input unit 16, but receives the third command signal in response to an operation command given by the third player U3 from the input unit 17 and outputs the third command signal to the game device 14.

Therefore, in the present embodiment, the first player U1 visually confirms the output unit 18 for the duration of the specific phase $\tau$, and it is possible to confirm the shift of the game status achieved in response to the third command signal of the second player U2 with a higher learning level than the first player U1.

Note that the output control unit 32C may store a time-series set of third operation commands to the specific phase $\tau$ that are given by the third player U3, in advance. Then, for the duration of the specific phase $\tau$, the output control unit 32C may not receive, from the input unit 16, the first command signal at in response to an operation command given by the first player U1 but may sequentially output the stored time-series set of the third command signals to the game device 14.

Note that the input unit 17 is not limited to the configuration of direct connection to the information processing device 12B. The input unit 17 may be connected to the information processing device 12B via the network N. The output unit 19 may be connected to the game device 14 via the network N.

[Procedure of Information Processing According to Second Embodiment]

Next, an example of a procedure of information processing performed by the information processing device 12B will be described.

Figure 11:
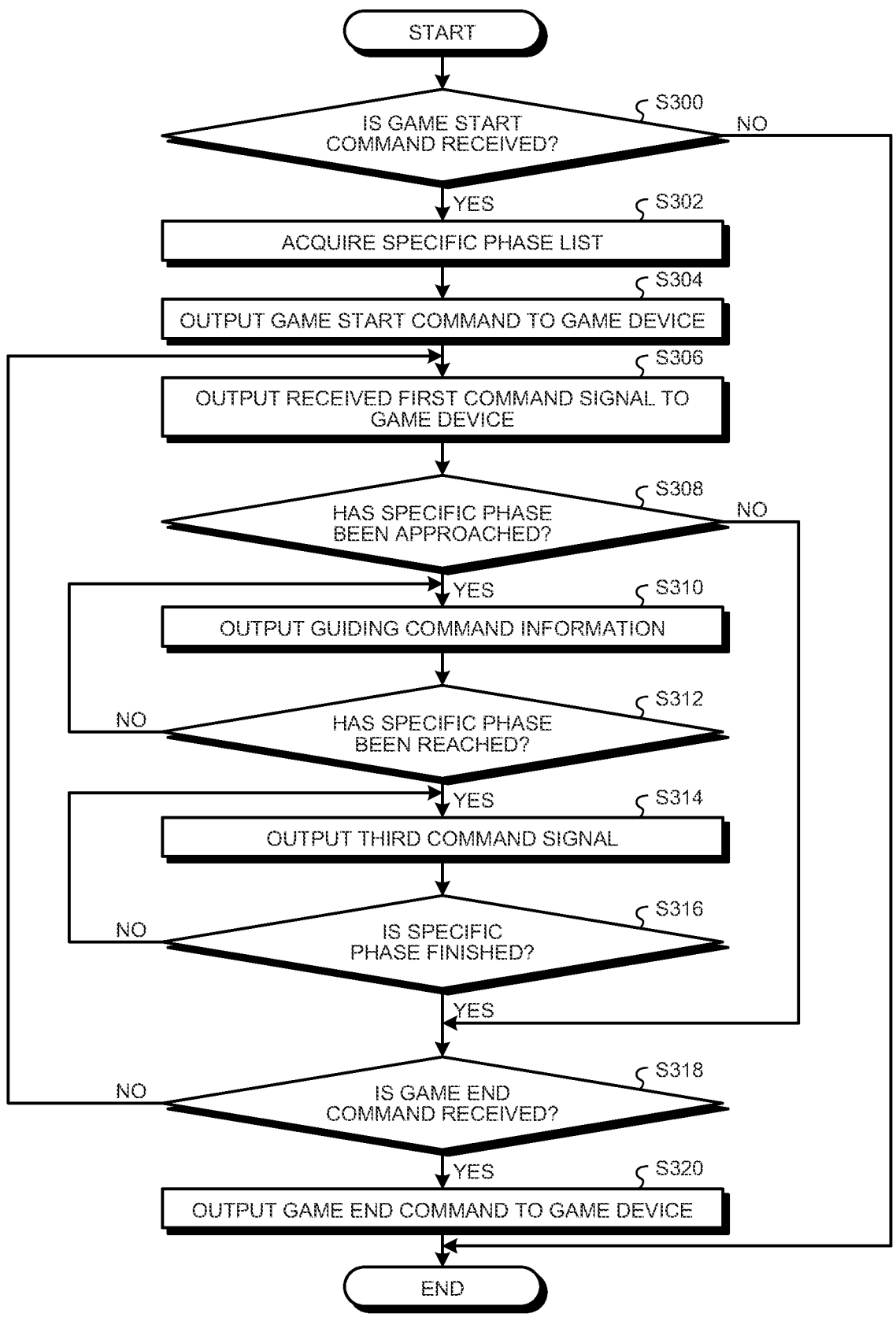
FIG. 11 is a flowchart illustrating an example of a procedure of information processing according to the second embodiment of the present disclosure.

FIG. 11 is a flowchart illustrating an example of the procedure of information processing performed by the information processing device 12B.

First, the acquisition unit 32A of the information processing device 12B determines whether a game start command has been received from the input unit 16 (Step S300). If a negative determination is made in Step S300 (Step S300: No), this routine is finished. On the other hand, if an affirmative determination is made in Step S300 (Step S300: Yes), the process proceeds to Step S302.

In Step S302, the acquisition unit 32A acquires a specific phase list of specific phases $\tau$ from the extraction device 10 via the communication unit 34 (Step S302). Next, the acquisition unit 32A outputs the game start command received in Step S300 to the game device 14 (Step S304).

Then, if receiving a first command signal at from the input unit 16, the output control unit 33C outputs the first command signal at to the game device 14 (Step S306). The game device 14 changes a game status according to the first command signal at. This process makes the game progress according to an operation command from the first player U1.

Next, the determination unit 32B determines whether the current game status C has approached the specific phase $\tau$ acquired in Step S302 (Step S308). If a negative determination is made in Step S308 (Step S308: No), the process proceeds to Step S318 which is described later. If an affirmative determination is made in Step S308 (Step S308: Yes), the process proceeds to Step S310.

In Step S310, the output control unit 33C outputs, to the game device 14, guiding command information guiding to a reproduced game status where a specific phase $\tau$ is reproduced, for the specific phase $\tau$ to which the current game status C is determined to have approached in Step S308 (Step S310).

Next, the output control unit 33C determines whether the current game status C reaches the first timing of the specific phase $\tau$ to which the current game status C is determined to have approached in Step S308 (Step S312). If a negative determination is made in Step S312 (Step S312: No), the process returns to Step S310 described above. On the other hand, if an affirmative determination is made in Step S312 (Step S312: Yes), the process proceeds to Step S314.

In Step S314, the output control unit 33C outputs a third command signal from the third player U3, to the game device 14 (Step S314). Next, the output control unit 33C determines whether the specific phase $\tau$ ends (Step S316). If a negative determination is made in Step S316 (Step S316: No), the process returns to Step S314 described above. On the other hand, if an affirmative determination is made in Step S316 (Step S316: Yes), the process proceeds to Step S318.

In the processing of Steps S314 to S316, for the duration of the specific phase $\tau$, the third command signal received from the third player U3 with a higher learning level than the first player, instead of a first command signal at received from the first player U1 is output to the game device 14.

Next, the acquisition unit 32A determines whether a game end command has been received from the input unit 16 (Step S318). If a negative determination is made in Step S318 (Step S318: No), the process returns to Step S306 described above. Therefore, when the specific phase τ has passed, the output control unit 33C directly outputs the first command signal at received from the input unit 16 to the game device 14 via the communication unit 38 (Step S306).

On the other hand, if an affirmative determination is made in Step S318 (Step S318: Yes), the process proceeds to Step S320.

In Step S320, the output control unit 33C outputs the game end command to the game device 14 via the communication unit 38 (Step S320), and this routine is finished.

As described above, for the duration of the specific phase τ, the information processing device 12B according to the present embodiment outputs, to the game device 14, the third command signal received from the third player U3 with a higher learning level than the first player U1, instead of a first command signal at received from the first player U1.

Therefore, for the duration of the specific phase τ, the information processing device 12B according to the present embodiment can provide the first player U1 the shift of the game status achieved in response to the third command signal of the second player U2 with a higher learning level than the first player U1. In other words, the information processing device 12B can readily provide the first player U1 the shift of the game status as a model.

Therefore, the information processing device 12B according to the present embodiment can further effectively support the improvement in learning level, in addition to the effects of the first embodiment described above.

Note that, in the configuration of FIG. 10, any one of the first player U1 and the third player U3 may be the computer U' (see the third embodiment). It is assumed that the first player U1 is a person and the third player U3 is the computer U'. In this case, the computer U' that has learned the game more than the first player U1 can shows a model for the game to the first player U1, thereby supporting the improvement in learning level of the first player U1. On the other hand, it is assumed that the first player U1 is the computer U' and the third player U3 is a person. In this case, it is possible for a person to support the improvement in learning level of the computer U' that learns game operations.

Third Embodiment

In the present embodiment, a mode will be described in which a third command signal input in response to an operation command given by the third player U3 with a higher learning level than the first player U1 is output to the first player U1 being the computer U', for the duration of a specific phase τ.

[Configuration of Information Processing System According to Third Embodiment]

Figure 12:
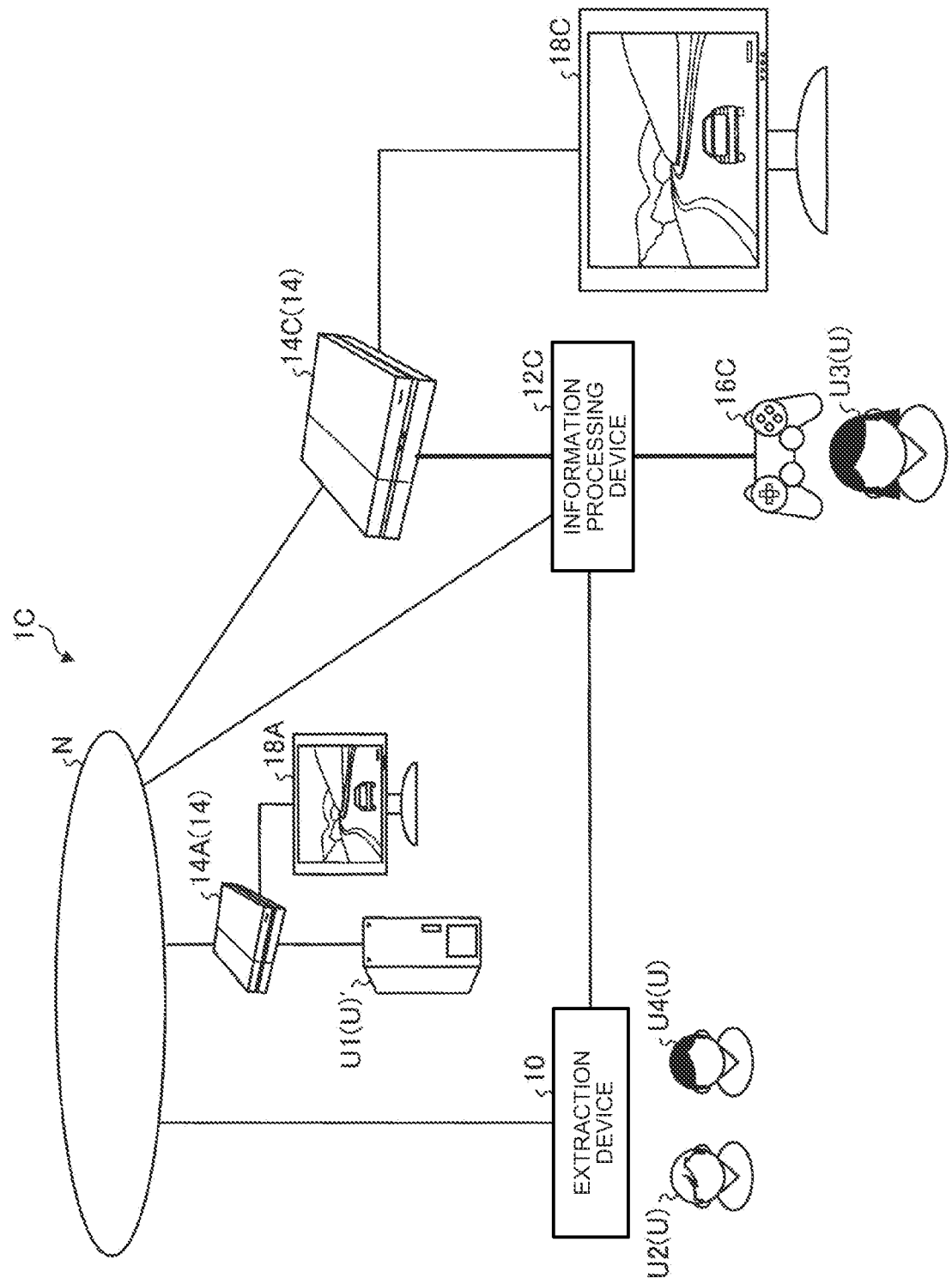
FIG. 12 is a schematic diagram illustrating an example of an information processing system according to a third embodiment of the present disclosure.

FIG. 12 is a schematic diagram illustrating an example of an information processing system 1C according to the present embodiment.

The information processing system 1C includes the extraction device 10, an information processing device 12C, a first game device 14A, and a third game device 14C. The extraction device 10, the first game device 14A, the third game device 14C, and the information processing device 12C are connected via the network N. At least two or more of the extraction device 10, the first game device 14A, the third game device 14C, and the information processing device 12C may be directly connected in a wired or wireless manner.

The first game device 14A is a game device 14 that receives a first command signal from the first player U1. An output unit 18A and the computer U' are connected to the first game device 14A. The output unit 18A is a display that displays a game image from the first game device 14A. Note that the output unit 18A is configured to be omitted as in the above embodiment.

In the present embodiment, as in the modification, a description is made of an example where the first player U1 is the computer U'. The computer U' is a device that inputs a first command signal for a game status achieved on the first game device 14A. As described in the modification, the computer U' includes a learning device or the like that searches for an optimum command signal or the like for a game status. In the present embodiment, the first player U1 being the computer U' is connected to the first game device 14A and is also connected via the network N to the third game device 14C and the information processing device 12C.

The third game device 14C is a game device 14 that advances a game in response to a third command signal from the third player U3. An output unit 18C and the information processing device 12C are connected to the third game device 14C. The output unit 18C is a display that displays a game image from the third game device 14C.

An input unit 16C is connected to the third game device 14C via the information processing device 12C. The input unit 16C is an input interface device for the third player U3 to input an operation to the third game device 14C. The input unit 16C outputs to the third game device 14C the third command signal in response to the operation command given by the third player U3. The input unit 16C includes a controller, keyboard, touch panel, pointing device, mouse, input button, or the like.

The information processing device 12C outputs various information to the third game device 14C. Furthermore, in the present embodiment, the information processing device 12C outputs various information to the first player U1 via the third game device 14C and the network N.

[Configuration of Information Processing Device According to Third Embodiment]

Figure 13:
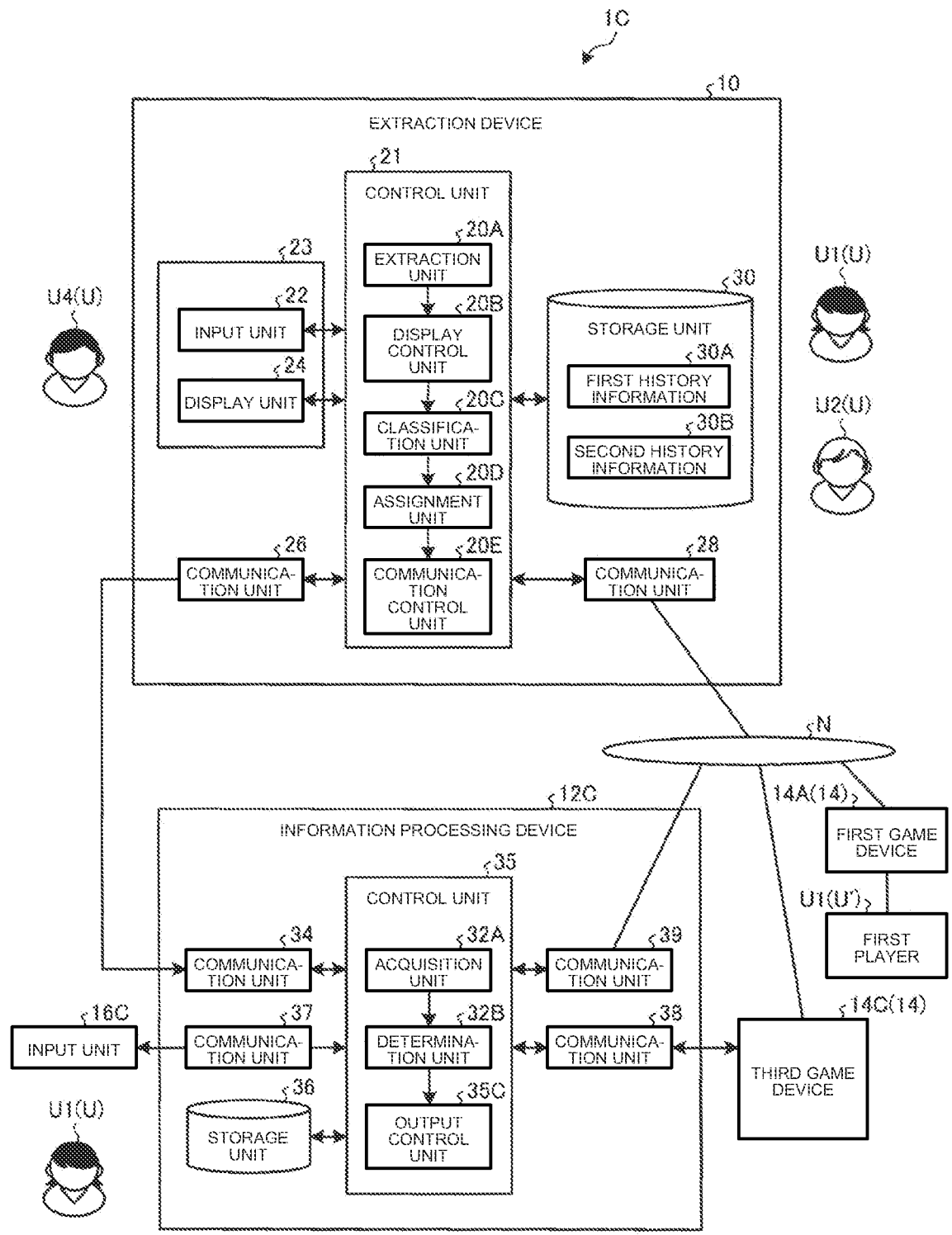
FIG. 13 is an example of a functional block diagram illustrating an extraction device and an information processing device according to a third embodiment of the present disclosure.

FIG. 13 is an example of a functional block diagram illustrating the extraction device 10 and the information processing device 12C of the information processing system 1C. The configuration of the extraction device 10 is configured similarly to those in the first embodiment.

The information processing device 12C includes a control unit 35, the communication unit 34, a storage unit 36, the communication unit 37, the communication unit 38, and a communication unit 39. The communication unit 34 and the storage unit 36 are configured similarly to those in the first embodiment. In the present embodiment, the communication unit 37 receives the third command signal from the input unit 16C. The communication unit 38 is a communication interface for communicating with the third game device 14C. The communication unit 39 is a communication interface that communicates with the first game device 14A and the computer U' being the first player U1, via the network N.

The control unit 35 controls the information processing device 12C. The control unit 35 includes an acquisition unit 32A, a determination unit 32B, and an output control unit 35C. The acquisition unit 32A and the determination unit 32B are similar to those of the information processing device 12 according to the first embodiment.

When a game status approaches a specific phase τ, the output control unit 35C outputs, to the game device 14, guiding command information guiding to a reproduced game status where the specific phase τ is reproduced, in a manner similar to the output control unit 32C according to the first embodiment. However, the output control unit 35C outputs the guiding command information to the third game device 14C.

In other words, in the present embodiment, when the game status of the third game device 14C that receives the third command signal from the third player U3 approaches the specific phase τ as the learning target for the first player U1, the output control unit 35C outputs the guiding command information to the third game device 14C as the game device 14.

Then, the output control unit 35C outputs to the first player U1 being the computer U' a time-series set of third command signals received for the duration of the specific phase τ from the third player U3.

Therefore, the first player U1 is capable of learning the third command signals received from the third player U3 with a higher game learning level than the first player U1, as command signals to be output to the first game device 14A, in the specific phase τ being the learning target for the first player U1.

Note that the output control unit 35C may output the time-series set of third command signals received for the duration of the specific phase τ from the third player U3, to the first player U1 being the computer U', via the third game device 14C.

Furthermore, the output control unit 35C may output to the first player U1 being the computer U', history information about games played by the third player U3 including the duration of the specific phase τ. In this configuration, the output control unit 35C preferably outputs history information including the time-series set of third command signals from the third player U3 and a time-series set of game statuses changed by the third command signals, to the first player U1 being the computer U'.

For the duration of the specific phase τ, the first player U1 being the computer U' preferably outputs the third command signals from the third player U3 to the first game device 14A so as to learn optimum command signals for a game status.

[Procedure of Information Processing According to Third Embodiment]

Next, an example of a procedure of information processing performed by the information processing device 12C will be described.

Figure 14:
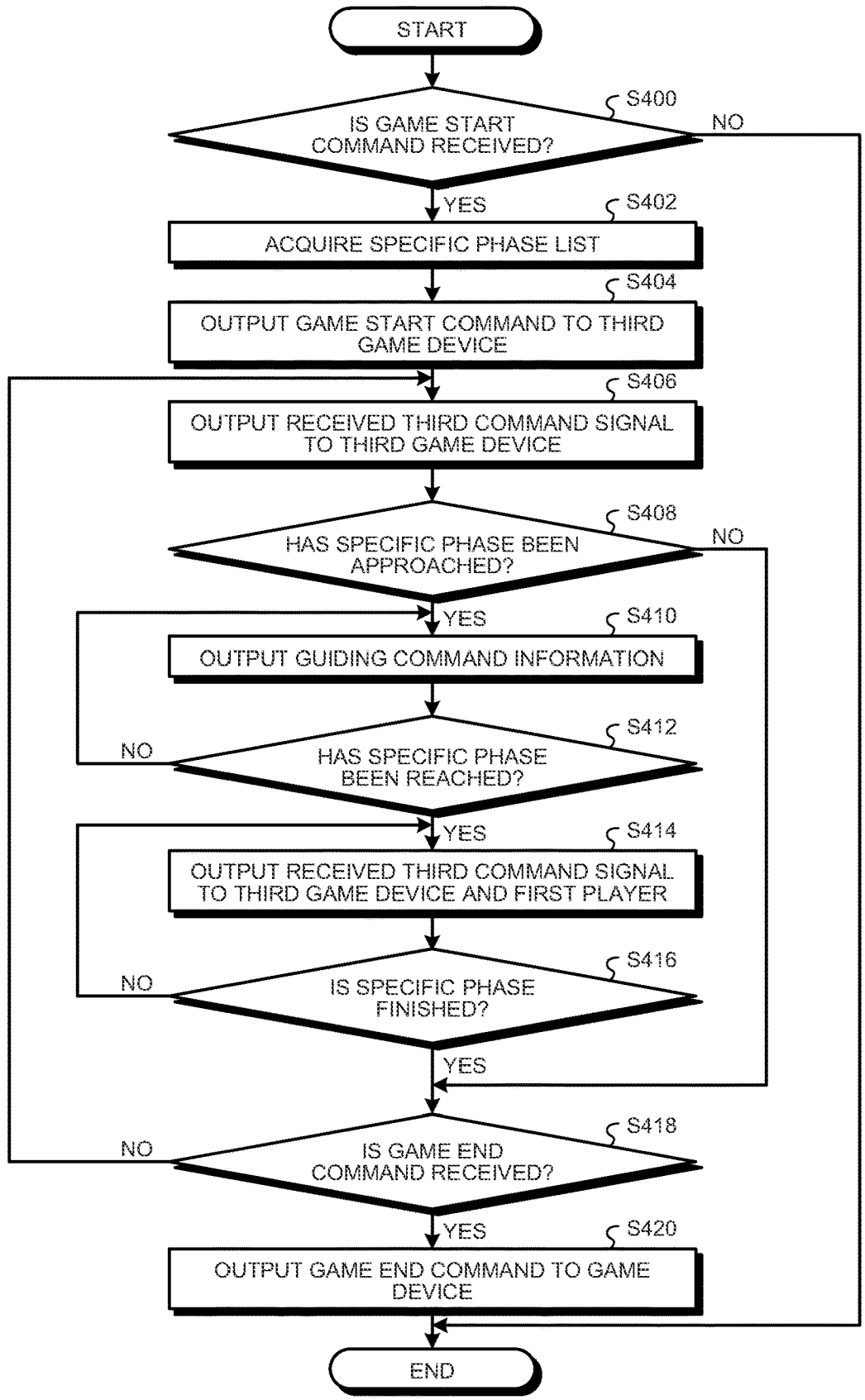
FIG. 14 is a flowchart illustrating an example of a procedure of information processing according to the third embodiment of the present disclosure.

FIG. 14 is a flowchart illustrating an example of the procedure of information processing performed by the information processing device 12C.

First, the acquisition unit 32A of the information processing device 12C determines whether a game start command has been received from the input unit 16C (Step S400). If a negative determination is made in Step S400 (Step S400: No), this routine is finished. On the other hand, if an affirmative determination is made in Step S400 (Step S400: Yes), the process proceeds to Step S402.

In Step S402, the acquisition unit 32A acquires a specific phase list of specific phases τ from the extraction device 10 via the communication unit 34 (Step S402). Next, the acquisition unit 32A outputs the game start command received in Step S400 to the third game device 14C (Step S404).

Then, when receiving a third command signal from the input unit 16C, the output control unit 35C outputs the third command signal to the third game device 14C (Step S406), and the third game device 14C changes a game status according to the third command signal. This process makes the game progress according to an operation command from the third player U3.

Next, the determination unit 32B determines whether the current game status C has approached the specific phase τ acquired in Step S402 (Step S408). If a negative determination is made in Step S408 (Step S408: No), the process proceeds to Step S418 which is described later. If an affirmative determination is made in Step S408 (Step S408: Yes), the process proceeds to Step S410.

In Step S410, the output control unit 35C outputs, to the third game device 14C, guiding command information guiding to a reproduced game status where a specific phase τ is reproduced, for the specific phase τ to which the current game status C is determined to have approached in Step S408 (Step S410).

Next, the output control unit 35C determines whether the current game status C reaches the first timing of the specific phase τ to which the current game status C is determined to have approached in Step S408 (Step S412). If a negative determination is made in Step S412 (Step S412: No), the process returns to Step S410 described above. On the other hand, if an affirmative determination is made in Step S412 (Step S412: Yes), the process proceeds to Step S414.

In Step S414, the output control unit 35C outputs the third command signal from the third player U3, to the third game device 14C and the first player U1 being the computer U' (Step S414).

Next, the output control unit 35C determines whether the specific phase τ ends (Step S416). If a negative determination is made in Step S416 (Step S416: No), the process returns to Step S414 described above. On the other hand, if an affirmative determination is made in Step S416 (Step S416: Yes), the process proceeds to Step S418.

In the processing of Steps S414 to S416, for the duration of the specific phase τ, the third command signal received from the third player U3 with a higher learning level than the first player U1 is output to the third game device 14C and the first player U1 being the computer U'.

Next, the acquisition unit 32A determines whether a game end command has been received from the input unit 16C (Step S418). If a negative determination is made in Step S418 (Step S418: No), the process returns to Step S406 described above.

On the other hand, if an affirmative determination is made in Step S418 (Step S418: Yes), the process proceeds to Step S420. In Step S420, the output control unit 35C outputs the game end command to the third game device 14C via the communication unit 38 (Step S420), and this routine is finished.

As described above, when the game status of the third game device 14C that receives the third command signal from the third player U3 with a higher learning level than the first player U1 approaches the specific phase τ, the output control unit 35C of the information processing device 12C according to the present embodiment outputs the guiding command information to the third game device 14C. Then, the output control unit 35C outputs to the first player U1, as the computer U', a time-series set of third command signals received for the duration of the specific phase τ from the third player U3.

As described above, the information processing device 12C according to the present embodiment provides the specific phase τ as the learning target for the first player U1, to the third player U3 with a higher learning level than the first player U1 and outputs the time-series set of third command signals in response to commands given by the third player U3 in the specific phase τ to the first player U1 as the computer U'.

Therefore, the information processing device 12C according to the present embodiment can reduce a learning time for the computer U' to learn an optimum command signal for the game status by, in addition to the effects of the above embodiment.

Fourth Embodiment

In the present embodiment, a mode will be described in which the extraction device 10 uses a training phase as a specific phase τ corresponding to each of one or more players U to further extract another specific phase τ not extracted from the first history information 30A of the first player U1.

[Configuration of Extraction Device According to Fourth Embodiment]

Figure 15:
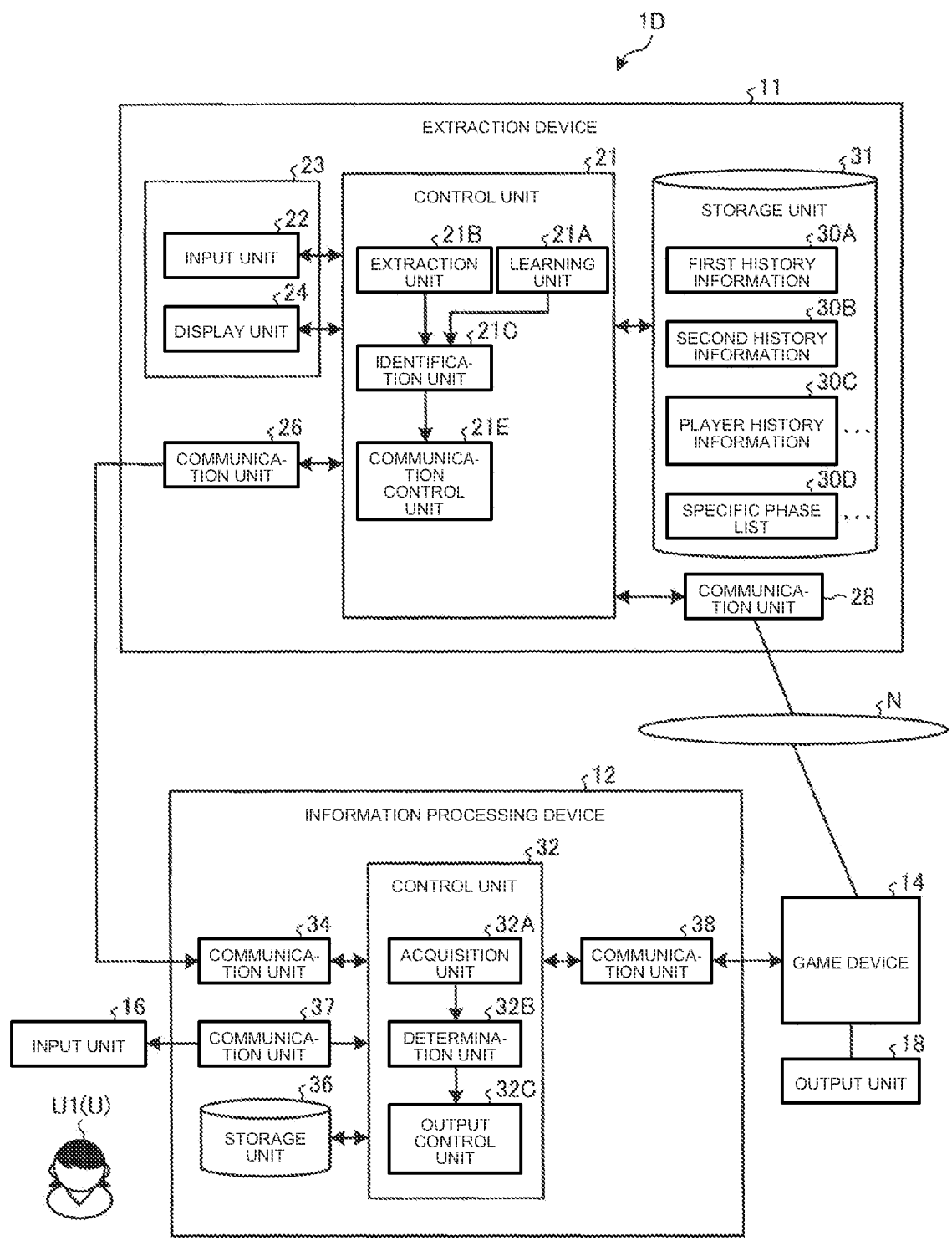
FIG. 15 is an example of a functional block diagram illustrating an extraction device and an information processing device according to a fourth embodiment of the present disclosure.

FIG. 15 is an example of a functional block diagram illustrating an extraction device 11 and the information processing device 12 included in an information processing system 1D according to the present embodiment. The information processing device 12 is configured similarly to those in the first embodiment.

The extraction device 11 extracts a specific phase τ of a game, in a manner similar to the extraction device 10 according to the first embodiment.

The extraction device 11 includes a control unit 21, the UI unit 23, the communication unit 26, a storage unit 31, and the communication unit 28. The UI unit 23, the communication unit 26, and the communication unit 28 are configured similarly to those in the first embodiment.

The storage unit 31 stores various information. In the present embodiment, the storage unit 30 stores the first history information 30A, the second history information 30B, a player history information 30C, and a specific phase list 30D.

The first history information 30A and the second history information 30B are configured similarly to those in the first embodiment. In other words, the first history information 30A is information indicating a history of games played by the first player U1. The second history information 30B is information indicating a history of games played by the second player U2 with a higher learning level of games than the first player U1.

The player history information 30C is information indicating a history of games played by a player U. In association with identification information about each of the one or more players U, the player history information 30C of the players U identified by the identification information is stored in the storage unit 31. Note that the player history information 30C has a data structure similar to the first history information 30A and the second history information 30B (see FIG. 3).

The specific phase list 30D is a list of specific phases τ extracted for each of the one or more players U. In association with the identification information about each of the one or more players U, the specific phase lists 30D for the players U identified by the identification information are stored in the storage unit 31. Note that, the specific phase list 30D is extracted by the control unit 21 by using history information (game log) of each player U, in a manner similar to the extraction unit 20A according to the first embodiment.

The extraction device 11 collects the first history information 30A, the second history information 30B, and the player history information 30C from one or more game devices 14 or an external device via the network N and stores the collected information in the storage unit 31.

Next, the control unit 21 will be described. The control unit 21 controls the extraction device 11. The control unit 21 includes an extraction unit 21A, a learning unit 21B, an identification unit 21C, and a communication control unit 21E.

Part or all of the extraction unit 21A, the learning unit 21B, the identification unit 21C, and the communication control unit 21E may be achieved, for example, by causing a processing device such as a CPU to execute a program, that is, by using software, may be achieved by using hardware such as an IC, or may be achieved by using both of the software and the hardware.

The extraction unit 21A extracts a specific phase τ of a game on the basis of the first history information 30A of the first player U1 and the second history information 30B of the second player U2, in a manner similar to the extraction unit 20A according to the first embodiment.

Here, in the present embodiment, the extraction unit 21A extracts the specific phase τ for the other players U by using the player history information 30C of the respective players U and the second history information 30B, in a manner similar to the extraction of the specific phase τ for the first player U1. Then, in association with the identification information about each of the plurality of players U, the extraction unit 21A stores the extracted specific phase list 30D for each player U, in the storage unit 31. For example, every time the player history information 30C is updated, the extraction unit 21A preferably extracts the specific phase τ for each player U and stores the specific phase τ in the storage unit 31, in association with the identification information about the player U.

In the present embodiment, when extracting a new specific phase τ for a player U, the extraction unit 21A uses the specific phase τ shown in the specific phase list 30D stored in the storage unit 31, as a training phase.

For example, it is assumed that a specific phase τ for the first player U1 is extracted.

In this case, the extraction unit 21A extracts a specific phase τ first on the basis of the first history information 30A of the first player U1 and the second history information 30B of the second player U2, in a manner similar to the extraction unit 20A according to the first embodiment.

Here, the specific phase τ extracted by the extraction unit 21A on the basis of the first history information 30A of the first player U1 and the second history information 30B of the second player U2 does not include a phase that is not played by the first player U1. However, even if a game phase is not played by the first player U1, another player U may have already played the game phase. In addition, a specific phase τ not played by the first player U1 may be extracted as a learning target for another player U with the same learning level as the first player U1.

Therefore, in the present embodiment, the extraction unit 21A identifies a distribution of training phases similar to a specific phase τ extracted on the basis of the first history information 30A of the first player U1, from a distribution of training phases (specific phases) shown in the specific phase list 30D stored in the storage unit 31 corresponding to each of the plurality of players U. For identification of the distribution of similar training phases, a well-known collaborative filtering algorithm or the like is preferably used.

Next, the extraction unit 21A identifies a training phase that is not included in a distribution of the specific phases τ for the first player U1, for the identified distribution of training phases. Then, the extraction unit 21A further extracts the identified training phase as a specific phase τ for the first player U1.

Therefore, the extraction unit 21A is capable of further extracting, as the specific phase τ for the first player U1, training phases of another player U having a distribution of specific phases τ similar to that for the first player U1 and not extracted as the specific phase τ for the first player U1.

In other words, the specific phases τ extracted for the first player U1 by the extraction unit 21A in the present embodiment includes a specific phase τ extracted on the basis of the first history information 30A of the first player U1 and a specific phase τ extracted on the basis of a player history information 30C of another player U. The specific phase τ extracted on the basis of the first history information 30A of the first player U1 is a phase that the first player U1 needs to learn. Furthermore, the specific phase τ extracted on the basis of a player history information 30C of another player U is a phase that the first player U1 has not yet experienced but is a phase that is highly likely to need to learn.

Note that a label may be assigned to each of the specific phases τ extracted for the first player U1 by the extraction unit 21A, according to a method of extracting the particular phase τ. For example, a label "+1" may be assigned to a specific phase τ that needs to be learned, a label "+0.5" to a specific phase τ that is unexperienced but highly likely to need learning, and further the extraction unit 21A may assign a label "0" indicating that the learning level is not determined due to no experience to the other phases not extracted for the first player U1. In addition, when a specific phase τ to which the label "+1" or the label "+0.5" is assigned includes the first command signal in the specific phase τ included in the latest first history information 30A of the first player U1 and the first command signal is a signal similar to the second command signal, the extraction unit 21A determines that further learning is unnecessary, and a label "−1" may be assigned.

In this way, assignment of a label to each of the specific phases τ by the extraction unit 21A facilitates selection of a specific phase τ as the learning target in the information processing device 12. For example, the output control unit 32C of the information processing device 12 preferably outputs the guiding command information to the game device 14 so as to preferentially learn a specific phase τ to which the label "+1" or "+0.5" is assigned, from among specific phases τ received from the extraction device 11.

Next, the identification unit 21C will be described. The identification unit 21C, on the basis of a specific phase τ extracted by the extraction unit 21A and a learning model, identifies a cluster to which the specific phase τ belongs and at least one of the label 48 and the priority 49 of the cluster.

The identification unit 21C uses a learning model learned by the learning unit 21B.

For example, the learning unit 21B collects specific phase lists of specific phases τ, results of clustering the specific phases τ of the specific phase lists, and labels 48 and priority 49 assigned to the respective clusters, via the network N and stores the specific phase lists, results of clustering, and labels 48 and priority 49 in the storage unit 31, the specific phase lists of specific phases τ being extracted for the respective players U by the extraction device 10 described in the first embodiment, the extraction device 11 in other embodiments, or the like. The learning unit 21B uses, as training data, the specific phase lists of specific phases τ extracted for the respective players U, the clusters to which the specific phases τ belong, and the labels 48 and the priority 49 that are assigned to the clusters.

Then, the learning unit 21B uses the training data to learn a learning model for deriving, from a specific phase τ, a cluster to which the specific phase τ belongs and at least one of a label 48 and priority 49 for the cluster. The learning unit 21B is preferably learn the learning model by performing classification learning and regression learning using known machine learning such as long short-term memory (LSTM).

The identification unit 21C introduces the specific phase τ extracted by the extraction unit 21A into the learning model to identify a cluster to which the specific phase τ belongs and at least one of the label 48 and priority 49 of the cluster. Therefore, in the present embodiment, the extraction device 11 is capable of identifying a cluster to which the specific phase τ belongs and at least one of the label 48 and priority 49 of the cluster without through an operation command from the third player U3 through the UI unit 23.

The communication control unit 21E transmits a specific phase list of specific phases τ extracted by the extraction unit 21A to the information processing device 12 via the communication unit 26. Note that the communication control unit 21E may transmit, to the information processing device 12, the specific phase list of specific phases τ, a result of clustering, and at least one of a label 48 and priority 49 that is assigned to a cluster.

[Procedure of Extraction Processing According to Fourth Embodiment]

Next, an example of a procedure of extraction processing performed by the extraction device 11 will be described.

Figure 16:
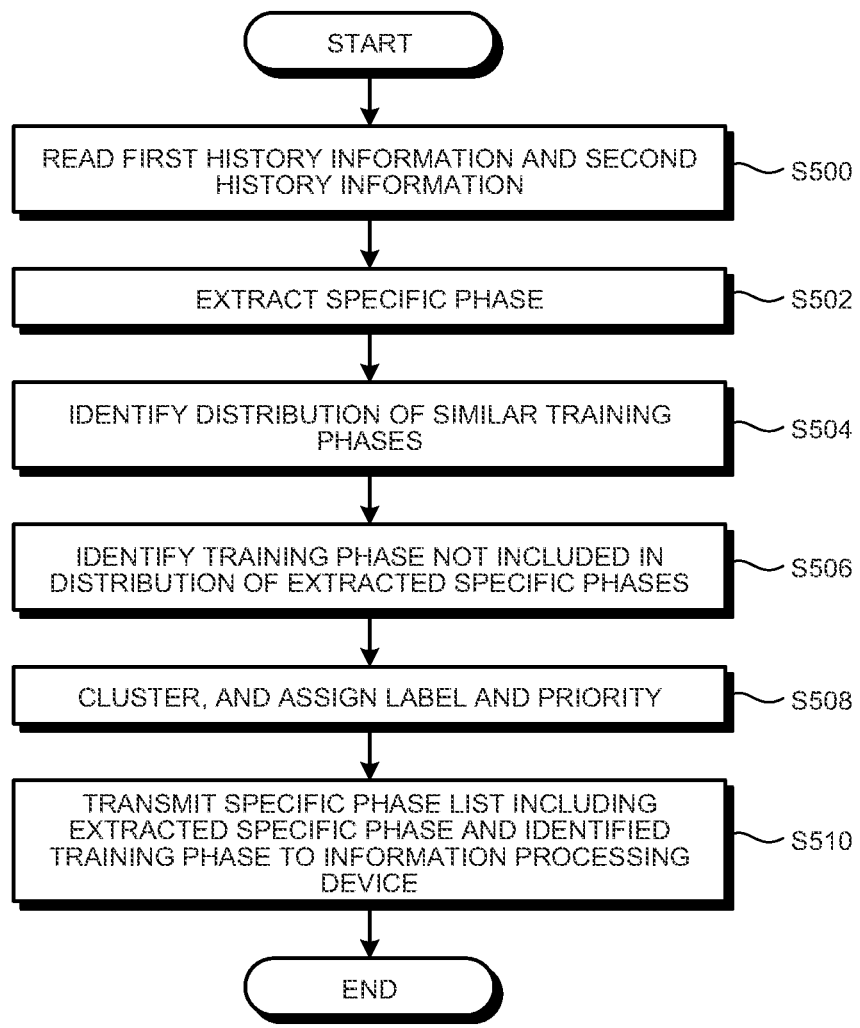
FIG. 16 is a flowchart illustrating an example of a procedure of extraction processing according to the fourth embodiment of the present disclosure.

FIG. 16 is a flowchart illustrating an example of the procedure of extraction processing performed by the extraction device 11.

First, the extraction unit 21A reads the first history information 30A and the second history information 30B from the storage unit 31 (Step S500).

Next, the extraction unit 21A extracts a specific phase τ on the basis of the first history information 30A and the second history information 30B read in Step 500 (Step S502).

Next, the extraction unit 21A identifies a distribution of training phases similar to the specific phase τ extracted in Step S502, from a distribution of training phases (specific phases) shown in the specific phase list 30D stored in the storage unit 31 corresponding to each of the plurality of players U (Step S504).

Next, the extraction unit 21A identifies a training phase that is not included in a distribution of the specific phases τ extracted in Step S502, for the distribution of training phases identified in Step S504 (Step S506).

Next, the identification unit 21C introduces the specific phase τ extracted in Step S502 and the specific phases τ as the training phases identified in Step S506 into the learning model and performs clustering of the specific phases τ and assignment of the label 48 and priority 49 to the cluster (Step S508).

Next, the communication control unit 21E transmits a specific phase list including the specific phase τ extracted in Step S502 and the specific phase τ identified as the training phase in Step S506 to the information processing device 12 via the communication unit 26 (Step S510). Note that the communication control unit 21E may transmit, to the information processing device 12, the specific phase list of specific phases τ, a result of clustering in Step S508, and at least one of a label 48 and priority 49 that is assigned to a cluster. Then, this routine is finished.

As described above, the extraction unit 21A of the extraction device 11 according to the present embodiment further extracts, as a specific phase τ for the first player U1, a training phase that is not included in a distribution of specific phases τ, for a distribution of training phases similar to the distribution of specific phases τ extracted from the distribution of training phases as specific phases τ corresponding to each of a plurality of players U on the basis of the first history information 30A.

Therefore, the extraction unit 21A is capable of further extracting, as the specific phase τ for the first player U1, training phases of another player U having a distribution of specific phases τ similar to that for the first player U1 and not extracted as the specific phase τ for the first player U1.

Therefore, the extraction device 11 according to the present embodiment can further effectively support the improvement in learning level, in addition to the effects of the above-described embodiment.

Note that although the embodiments and modifications thereof according to the present disclosure have been described above, the processing according to the above embodiments and modifications may be performed in various different forms in addition to the above embodiments and modifications. Furthermore, the above embodiments and modifications can be appropriately combined within a range consistent with the contents of the processing.

Furthermore, the effects described herein are merely examples, the present invention is not limited to these effects, and other effects may also be provided.

[Targets to which Extraction Device and Information Processing Device According to Above Embodiments and Modifications are to be Applied]

Targets to which the extraction devices 10 and 11 and the information processing devices 12, 12B, and 12C according to the above embodiments and modifications are to be applied are not limited. For example, the extraction devices 10 and 11 and the information processing devices 12, 12B, and 12C can be applied to a system that uses the game device 14 or a development tool kit that is used for a game developer.

In a case where the extraction devices 10 and 11 and the information processing devices 12, 12B, and 12C are applied to the development tool kit for game developers, a training game for characters, avatars, or the like that function in the game or development of artificial intelligence (AI) mounted in a game are made efficient, in addition to the effects of the above embodiments and modifications.

(Hardware Configuration)

Figure 17:
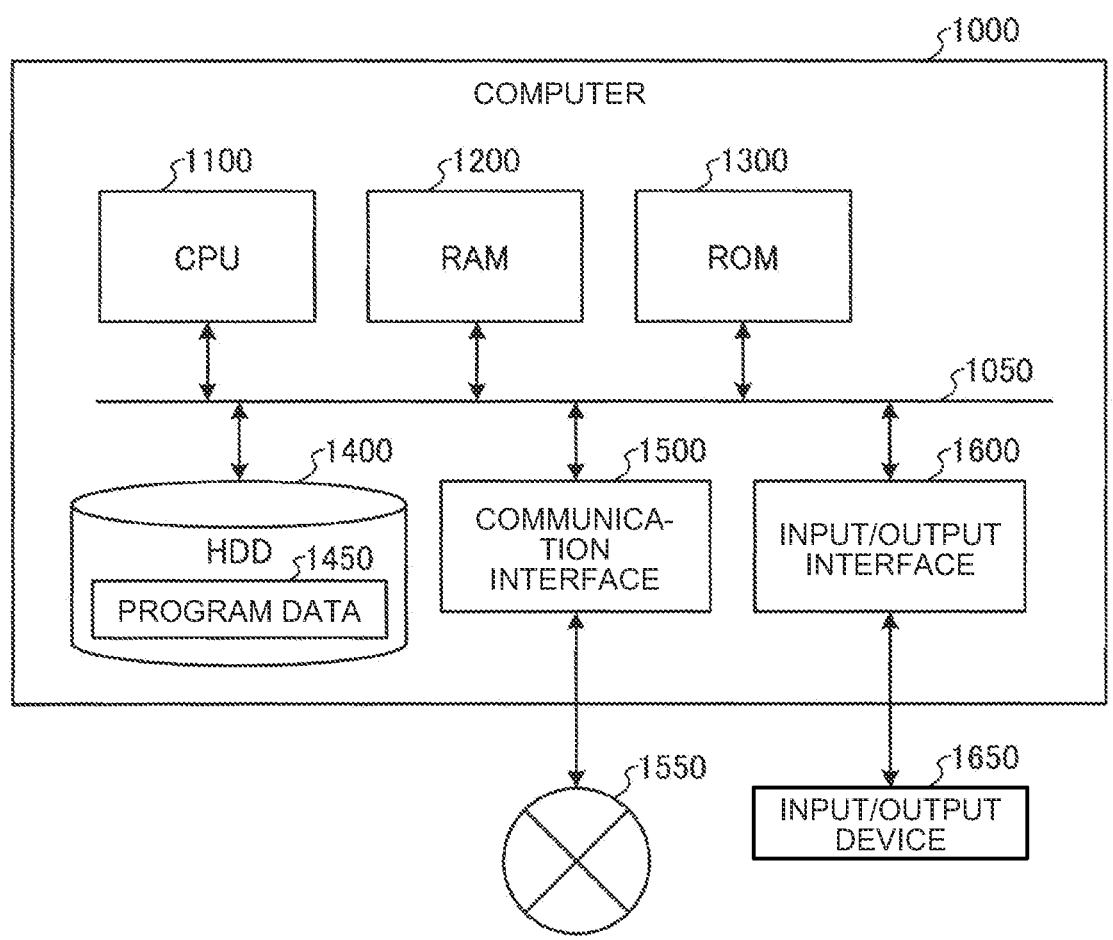
FIG. 17 is a hardware configuration diagram illustrating an example of a computer that achieves functions of an extraction device and an information processing device according to the present disclosure.

FIG. 17 is a hardware configuration diagram illustrating an example of a computer 1000 that achieves the functions of the extraction devices 10 and 11 and the information processing devices 12, 12B, and 12C according to the above-described embodiments and modifications.

The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 is operated on the basis of a program stored in the ROM 1300 or the HDD 1400 and controls each unit. For example, the CPU 1100 deploys a program stored in the ROM 1300 or the HDD 1400 to the RAM 1200 and executes processing corresponding to various programs.

The ROM 1300 stores a boot program such as a basic input output system (BIOS) executed by the CPU 1100 when the computer 1000 is booted, a program depending on hardware of the computer 1000, and the like.

The HDD 1400 is a computer-readable recording medium that non-transitorily records a program executed by the CPU 1100, data used by the program, and the like. Specifically, the HDD 1400 is a recording medium that records a program according to the present disclosure as an example of program data 1450.

The communication interface 1500 is an interface for connecting the computer 1000 to an external network 1550 (e.g., the Internet). For example, the CPU 1100 receives data from another device or transmits data generated by the CPU 1100 to another device via the communication interface 1500.

The input/output interface 1600 is an interface that connects between an input/output device 1650 and the computer 1000. For example, the CPU 1100 receives data from an input device such as a keyboard or mouse via the input/output interface 1600. In addition, the CPU 1100 transmits data to an output device such as a display, speaker, or printer via the input/output interface 1600. Furthermore, the input/output interface 1600 may function as a media interface for reading a program or the like recorded on a predetermined recording medium. The medium includes, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the information processing device 12 according to the first embodiment, the CPU 1100 of the computer 1000 achieves the function of the acquisition unit 32A or the like by executing an information processing program loaded on the RAM 1200. Furthermore, the HDD 1400 stores the information processing program according to the present disclosure or data in the storage unit 36. Note that the CPU 1100 executes the program data 1450 read from the HDD 1400, but as another example, the CPU 1100 may acquire these programs from another device via the external network 1550.

Moreover, the present technology can also have the following configuration.

(1)

An information processing device comprising an output control unit that, when a game status approaches a specific phase, outputs guiding command information guiding to a reproduced game status where the specific phase is reproduced, to a game device.

(2)

The information processing device according to (1), wherein the specific phase is represented by a time-series set of game statuses.

(3)

The information processing device according to (1) or (2), wherein the output control unit outputs, to the game device, the guiding command information that stepwise or continuously guides a game status toward the reproduced game status.

(4)

The information processing device according to any one of (1) to (3), wherein the specific phase is a phase as a learning target for a first player.

(5)

The information processing device according to (4), wherein the specific phase, in a time-series set of second game statuses of a second player with a higher learning level than the first player, is a phase ranging from a time point where a distance to a time-series set of first game statuses in the past of the first player is equal to or less than a first threshold to a time point where the distance exceeds a second threshold that is larger than the first threshold.

(6)

The information processing device according to (5), wherein the reproduced game status, in a time-series set of second game statuses of the second player, represents the second game status at a time point where a distance to a time-series set of first game statuses in the past of the first player is equal to or less than the first threshold.

(7)

The information processing device according to any one of (4) to (6), wherein the output control unit outputs, to the game device, the guiding command information including at least one of the correction command signal and game status changing command information, the correction command signal causing the game status to change in a direction approaching the reproduced game status is obtained by correcting a first command signal received from the first player, and the game status changing command information changes a game status in a direction approaching the reproduced game status.

(8)

The information processing device according to any one of (4) to (6), in which the output control unit outputs, on the basis of priority assigned to a cluster to which the specific phase belongs, the guiding command information, for the specific phase belonging to the cluster having a higher priority, in priority to another specific phase belonging to another cluster.

(9)

The information processing device according to any one of (4) to (6), wherein the output control unit, for a duration of the specific phase, outputs, to the game device, a third command signal received from a third player with a higher learning level than the first player, instead of a first command signal received from the first player.

(10)

The information processing device according to any one of (4) to (6), wherein the output control unit, when a game status of a third game device that receives a third command signal from a third player with a higher learning level than the first player approaches the specific phase, outputs the guiding command information to the third game device as the game device, and outputs, to the first player as a computer, a time-series set of the third command signals received from the third player for a duration of the specific phase.

(11)

An extraction device comprising an extraction unit that extracts a specific phase of a game based on first history information indicating a time-series set of first game statuses of a first player and second history information indicating a time-series set of second game statuses of a second player with a higher learning level than the first player.

(12)

The extraction device according to (11), wherein the extraction unit extracts, as the specific phase, a phase ranging from a time point where a distance to a time-series set of first game statuses of the first player is equal to or less than a first threshold to a time point where the distance exceeds a second threshold that is larger than the first threshold, in the time-series set of second game statuses.

(13)

The extraction device according to (11) or (12), further comprising:

a classification unit that classifies a plurality of the specific phases into at least one or more clusters according to a classification rule specified by a fourth player; and an assignment unit that assigns at least one of a label and priority to each of the clusters, in response to a command from the fourth player.

(14)

The extraction device according to (11) or (12), further comprising:

an identification unit that identifies a cluster to which the specific phase belongs and at least one of a label and priority of the cluster, based on a learning model for deriving, from the specific phase, a cluster to which the specific phase belongs and at least one of a label and priority of the cluster and the specific phase extracted by the extraction unit.

(15)

The extraction device according to any one of (11) to (14), wherein the extraction unit further extracts, as the specific phase for the first player, a training phase that is not included in a distribution of the specific phases, for a distribution of the training phases similar to the distribution of the specific phases extracted from the distribution of the training phases as the specific phases corresponding to each of a plurality of players based on the first history information.

(16)

Information processing method comprising outputting, when a game status approaches a specific phase, guiding command information guiding to a reproduced game status where the specific phase is reproduced, to a game device, wherein the step is performed by a computer.

(17)

An extraction method comprising extracting a specific phase of a game based on first history information indicating a time-series set of first game statuses of a first player and second history information indicating a time-series set of second game statuses of a second player with a higher learning level than the first player, wherein the step is performed by a computer.

REFERENCE SIGNS LIST 10, 11 EXTRACTION DEVICE
12, 12B, 12C INFORMATION PROCESSING DEVICE
20A, 21A EXTRACTION UNIT
32C, 33C, 35C OUTPUT CONTROL UNIT

The invention claimed is:

1. An information processing device, comprising:
at least one processor configured to:
acquire a specific phase of a game;
determine that a first game status of the game approaches the acquired specific phase;

receive, as an input, a first command signal in response to the first game status that approaches the specific phase;

generate guiding command information to change the received first command signal, wherein
the received first command signal is changed to guide the first game status to a reproduced game status, and
the reproduced game status indicates a second game status where the specific phase is reproduced; and control to output the changed first command signal to a game device, wherein
the specific phase is a phase as a learning target for a first player,
the specific phase, in a time-series set of second game statuses of a second player with a higher learning level than the first player, is the phase ranging from a first time point to a second time point,
at the first time point, a distance from the time-series set of the second game statuses to a time-series set of first game statuses in the past of the first player is one of equal to or less than a first threshold, and
at the second time point, the distance from the time-series set of the second game statuses to the time-series set of the first game statuses in the past of the first player exceeds a second threshold that is larger than the first threshold.

2. The information processing device according to claim 1, wherein the specific phase is represented by a time-series set of game statuses of the game.

3. The information processing device according to claim 1, wherein the guiding command information one of stepwisely or continuously guides the first game status toward the reproduced game status.

4. The information processing device according to claim 1, wherein the reproduced game status, in the time-series set of the second game statuses of the second player, represents the second game status at the first time point.

5. The information processing device according to claim 1, wherein
the guiding command information includes a correction command signal,
the correction command signal controls the first game status to change in a direction approaching the reproduced game status, and
the correction command signal is obtained by correction of the first command signal received from the first player.

6. The information processing device according to claim 1, wherein the at least one processor is further configured to, for a duration of the specific phase, control to output a third command signal received from a third player with the higher learning level than the first player.

7. The information processing device according to claim 1, wherein
the game device is a third game device,
the first player is a computer, and
the at least one processor is further configured to:
receive a third command signal from a third player with a higher learning level than the first player;
control to output the guiding command information to the third game device based on a third game status approaches the specific phase; and
control to output, to the first player, a time-series set of the third command signal received from the third player, wherein the third command signal is output to the first player for a duration of the specific phase.

8. An extraction device, comprising:
at least one processor configured to:
extract a specific phase of a game based on first history information and second history information, wherein
the first history information indicates a time-series set of first game statuses of a first player, and
the second history information indicates a time-series set of second game statuses of a second player with a higher learning level than the first player;
classify a plurality of specific phases into at least one cluster based on a classification rule specified by a fourth player, wherein a specific cluster of the at least one cluster includes the specific phase;
assign at least one of a label or a priority to each of the at least one cluster based on a command from the fourth player; and
transmit the extracted specific phase and information associated with each of the specific cluster and the at least one of the label or the priority of the specific cluster, to a device.

9. The extraction device according to claim 8, wherein
the at least one processor is further configured to extract, as the specific phase, a phase ranging from a first time point to a second time point from the time-series set of the second game statuses of the second player,
at the first time point, a distance from the time-series set of the second game statuses to the time-series set of the first game statuses in the past of the first player is one of equal to or less than a first threshold, and
at the second time point, the distance from the time-series set of the second game statuses to the time-series set of the first game statuses in the past of the first player exceeds a second threshold that is larger than the first threshold.

10. The extraction device according to claim 8, wherein
the at least one processor is further configured to identify the specific cluster and the at least one of the label or the priority of the specific cluster, based on a learning model, and
the learning model derives, from the specific phase, the specific cluster and the at least one of the label or the priority of the specific cluster.

11. The extraction device according to claim 8, wherein the at least one processor is further configured to:
identify a distribution of training phases similar to the specific phase;
identify a training phase that is not included in a distribution of the plurality of specific phases based on the identification of the distribution of the training phases; and
extract the identified training phase as the specific phase for the first player based on the first history information.

12. An information processing method, comprising:
acquiring, by at least one processor, a specific phase of a game;
determining, by the at least one processor, that a first game status of the game approaches the acquired specific phase;
receiving, by the at least one processor, as an input, a first command signal in response to the first game status that approaches the specific phase;

generating, by the at least one processor, guiding command information guiding to change the received first command signal, wherein
 the received first command signal is changed to guide the first game status to a reproduced game status, and
 the reproduced game status indicates a second game status where the specific phase is reproduced; and
controlling to output, by the at least one processor, the changed first command signal to a game device, wherein
 the specific phase is a phase as a learning target for a first player,
 the specific phase, in a time-series set of second game statuses of a second player with a higher learning level than the first player, is the phase ranging from a first time point to a second time point,
 at the first time point, a distance from the time-series set of the second game statuses to a time-series set of first game statuses in the past of the first player is one of equal to or less than a first threshold, and
 at the second time point, the distance from the time-series set of the second game statuses to the time-series set of the first game statuses in the past of the first player exceeds a second threshold that is larger than the first threshold.

13. An extraction method, comprising:
extracting, by at least one processor, a specific phase of a game based on first history information and second history information, wherein
 the first history information indicates a time-series set of first game statuses of a first player, and
 the second history information indicates a time-series set of second game statuses of a second player with a higher learning level than the first player;
classifying, by the at least one processor, a plurality of specific phases into at least one cluster based on a classification rule specified by a fourth player, wherein a specific cluster of the at least one cluster includes the specific phase;
assigning, by the at least one processor, at least one of a label or a priority to each of the at least one cluster based on a command from the fourth player; and
transmitting, by the at least one processor, the extracted specific phase and information associated with each of the specific cluster and the at least one of the label or the priority of the specific cluster, to a device.

* * * * *